(12) United States Patent
Senoue et al.

(10) Patent No.: US 9,077,036 B2
(45) Date of Patent: Jul. 7, 2015

(54) LITHIUM ION SECONDARY BATTERY, POSITIVE ELECTRODE ACTIVE MATERIAL, POSITIVE ELECTRODE, ELECTRIC TOOL, ELECTRIC VEHICLE, AND POWER STORAGE SYSTEM

(75) Inventors: Masaharu Senoue, Fukushima (JP); Kenichi Kawase, Fukushima (JP); Takakazu Hirose, Fukushima (JP); Masayuki Ihara, Fukushima (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 13/326,013

(22) Filed: Dec. 14, 2011

(65) Prior Publication Data

US 2012/0164533 A1 Jun. 28, 2012

(30) Foreign Application Priority Data

Dec. 28, 2010 (JP) ................... 2010-293269

(51) Int. Cl.
*H01M 4/485* (2010.01)
*H01M 4/505* (2010.01)
*H01M 4/525* (2010.01)

(52) U.S. Cl.
CPC .............. *H01M 4/525* (2013.01); *H01M 4/485* (2013.01); *H01M 4/505* (2013.01); *Y02E 60/122* (2013.01)

(58) Field of Classification Search
USPC .................... 429/231.1, 231.3, 223, 218.1
See application file for complete search history.

(56) References Cited

U.S. PATENT DOCUMENTS

| | | | |
|---|---|---|---|
| 2005/0118496 A1* | 6/2005 | Chang et al. | 429/62 |
| 2008/0135801 A1* | 6/2008 | Kizaki et al. | 252/182.1 |
| 2008/0145757 A1* | 6/2008 | Mah et al. | 429/219 |
| 2008/0311473 A1* | 12/2008 | Sasaoka et al. | 429/223 |
| 2009/0127520 A1* | 5/2009 | Whitfield et al. | 252/519.15 |
| 2010/0178566 A1* | 7/2010 | Kogetsu et al. | 429/231.95 |
| 2010/0233543 A1* | 9/2010 | Numata et al. | 429/224 |

FOREIGN PATENT DOCUMENTS

| | | |
|---|---|---|
| JP | 06-342673 | 12/1994 |
| JP | 08315819 A * | 11/1996 |
| JP | 09-241026 | 9/1997 |
| JP | 09-241027 | 9/1997 |
| JP | 2000-348721 | 12/2000 |
| JP | 2002304974 A * | 10/2002 |
| JP | 2006-127911 | 5/2006 |
| JP | 2007026983 A * | 2/2007 |
| JP | 2007-172954 | 7/2007 |
| JP | 2008-293954 | 12/2008 |
| JP | 2010-009806 | 1/2010 |
| JP | 2010108793 A * | 5/2010 |
| WO | WO 0129920 A1 * | 4/2001 |

OTHER PUBLICATIONS

IPDL Machine Translation of JP 08-315819A (Nov. 1996).*
Lee et al., "Li2Ni1-XMXO2 as an additive material in cathode for high energy Si-based lithium ion battery," The Electrochemical Society 215th ECS Meeting, Abstract #169, 2009. (1 page).
Back et al., "Gas Evolution of Overlithiated Li2NiO2 as Cathode Active Material for Li-ion Rechargeable Batteries and Al2O3 Coating to Suppress the Gas Evolution,"The Electrochemical Society 217th ECS Meeting, Abstract #142, 2010. (1 page).

* cited by examiner

*Primary Examiner* — Gregg Cantelmo
(74) *Attorney, Agent, or Firm* — K&L Gates LLP

(57) ABSTRACT

A lithium ion secondary battery including a positive electrode; a negative electrode; and an electrolytic solution, wherein the positive electrode includes a first lithium composite oxide and a second lithium composite oxide expressed by following formula (1) as a positive electrode active material, and wherein the second lithium composite oxide has a charge capacity greater than the first lithium composite oxide $$Li_{1+a}(Ni_bM1_cM2_{1-b-c})_{1.5-0.5a}O_2 \quad (1)$$

wherein, M1 represents at least one selected from among elements of group 13 to group 15 in an extended periodic table of elements excluding boron B, or carbon C, or nitrogen N, M2 represents at least one selected from among elements of group 3 to group 12, and a, b, and c satisfy relationships of $0.95 \le a \le 1.05$, $0 < b \le 0.99$, and $0 < c \le 0.15$.

15 Claims, 5 Drawing Sheets

LITHIUM ION SECONDARY BATTERY, POSITIVE ELECTRODE ACTIVE MATERIAL, POSITIVE ELECTRODE, ELECTRIC TOOL, ELECTRIC VEHICLE, AND POWER STORAGE SYSTEM

CROSS REFERENCES TO RELATED APPLICATIONS

The present application claims priority to Japanese Priority Patent Application JP 2010-293269 filed in the Japan Patent Office on Dec. 28, 2010, the entire content of which is hereby incorporated by reference.

BACKGROUND

The present disclosure relates to a positive electrode active material containing a composite oxide including lithium and a transition metal as a constituent element, a positive electrode and a lithium ion secondary battery that use the positive electrode active material, an electric tool and an electric vehicle that use the lithium ion secondary battery, and a power storage system.

In recent years, a small-sized electronic apparatus represented by a portable terminal device or the like has become widespread, and a further reduction in size and weight, and a long operational lifespan are strongly demanded. Along with this, a development of a battery as a power source, particularly, a secondary battery, which is small in size and is light in weight, and which can obtain a high energy density, has been progressed. In recent years, this secondary battery has been reviewed for an application for use in a large-sized electronic apparatus such as a vehicle while not being limited to a small-sized electronic apparatus.

As secondary batteries, secondary batteries using various charge and discharge principles have been proposed, but among these, a lithium ion secondary battery using occlusion and emission of lithium ions has attracted attention. This is because an energy density higher than that in a lead battery, a nickel-cadmium battery, or the like, can be obtained.

The lithium ion secondary battery includes a positive electrode, a negative electrode, and an electrolytic solution, and the positive electrode and the negative electrode include a positive electrode active material and a negative electrode active material that occludes and emits lithium ions, respectively. As the positive electrode active material, a composite oxide including lithium and a transition metal as a constituent element is widely used. The positive electrode active material, which is directly related to a charge and discharge reaction, has a large effect on a battery performance, such that various studies have been undertaken with respect to the kind and a composition of the composite oxide, or the like.

Specifically, a method in which a lithium-containing compound having a lower potential and a higher capacity density than $LiCoO_2$ is used together with $LiCoO_2$ to prevent a capacity from decreasing due to the taking-in of lithium to a negative electrode is proposed (for example, refer to Japanese Unexamined Patent Application Publication No. 06-342673). This lithium-containing compound includes $Li_2NiO_2$ or the like, which is expressed by a general formula $Li_xMO_y$ (here, M represents a transition metal such as Mo, and $x/y \geq 0.5$).

In addition, a method in which a lithium copper composite oxide is used to prevent charge and discharge capacity due to charge and discharge from decreasing is proposed (for example, refer to Japanese Unexamined Patent Application Publication No. 2006-127911). This lithium copper composite oxide includes $Li_2(Cu_{0.8}Al_{0.1}Zr_{0.1})O_2$ or the like, which is expressed by a general formula $Li_2(Cu_{1-x-y}M_xD_y)O_2$ (M is an element of one kind or more selected from elements of group 13 or the like, D is an element of one kind or more selected from Ti or the like, $0<x<0.5$, $0<y<0.5$, and $x+y<0.5$).

In addition, a method in which a lithium zinc copper composite oxide is used to increase charge and discharge capacity is proposed (for example, refer to Japanese Unexamined Patent Application Publication No. 2000-348721). This lithium zinc copper composite oxide includes $Li_{1.98}Zn_{0.01}CuO_2$ or the like, which is expressed by a general formula $Li_{2-2x}Zn_xCuO_2$ ($0.01 \leq x \leq 0.49$).

In addition, a method in which a lithium nickel composite oxide is used to realize a large capacity is proposed (for example, refer to Japanese Unexamined Patent Application Publication Nos. 09-241027 and 09-241026). This lithium nickel composite oxide includes $Li_2NiO_{2.2}$ or the like, which is expressed by a general formula $Li_2NiO_{2+y}$ ($0<y<0.3$), or $Li_{2.05}Ni_{0.95}O_2$ or the like, which is expressed by a general formula $Li_{2+x}Ni_{1-x}O2$ ($0<y<1/7$).

In addition, a method in which a first lithium layered compound in which a reinsertion amount of lithium ion with respect to an initial withdrawal amount of lithium ion with 4.5 to 3 V (lithium standard) is 80% or more, and a second lithium layered compound in which this ratio is 15% or less are used to improve a battery capacity and cycle characteristics is proposed (for example, refer to Japanese Unexamined Patent Application Publication No. 2010-009806). The first lithium layered compound includes $LiCoO_2$ or the like, which contains at least one kind selected from among Co, and Ni. The second lithium layered compound includes $Li_{1.29}(Ni_{0.33}Fe_{0.33}Mn_{0.33})_{0.71}O_2$ or the like, which includes at least one kind selected from among Fe, Mn, and Ni.

In addition to this, as a related technology, a review with respect to a negative electrode has been made. Specifically, a method in which a lithium-containing metal compound is used as a negative electrode active material to compensate for an irreversible capacity which occurs during an initial charge and discharge is proposed (for example, refer to Japanese Unexamined Patent Application Publication No. 2007-172954). This lithium-containing metal compound can emit lithium during at least discharge.

In addition, a method in which metallic lithium is used to compensate for an irreversible capacity and thus lithium is directly applied to the negative electrode is proposed (for example, refer to Japanese Unexamined Patent Application Publication No. 2008-293954).

SUMMARY

To obtain a high battery capacity even when charge and discharge is repeated, as is already suggested, the compensation for an irreversible capacity which occurs in a negative electrode during an initial charge and discharge is effective. Therefore, as a positive electrode active material, $Li_2NiO_2$-based composite oxide for compensation is used together with a composite oxide such as $LiCoO_2$ for a general high capacity. This $Li_2NiO_2$-based composite oxide is a material in which a part of $Li_2NiO_2$ or Ni is substituted with one kind or two or more kinds of transition metals.

However, when the $Li_2NiO_2$-based composite oxide is used, oxygen gas is generated due to a decomposition reaction of $Ni_2O$ generated during charge and discharge, such that safety becomes an issue. Therefore, in the related art, battery performance (battery capacity characteristic) and safety (gas emission characteristic) have a trade-off relationship, such that it is difficult for both of these to be compatible with each other.

In addition, a method of directly compensating for metallic lithium is already suggested, but this metallic lithium is very active with respect to moisture, such that it is difficult to handle an electrode and there is a possibility that manufacturing costs may increase.

The present disclosure has been made in consideration of the above-described problems, and it is desirable to provide a positive electrode active material, a positive electrode, a lithium ion secondary battery, an electric tool, an electric vehicle, and a power storage system, in which an excellent battery capacity characteristic and a gas emission characteristic can be obtained.

According to an embodiment of the present disclosure, there is provided a positive electrode active material including a first lithium composite oxide and a second lithium composite oxide expressed by the following formula (1). However, a charge capacity vs lithium metal per unit volume of the second lithium composite oxide is larger than that of the first lithium composite oxide.

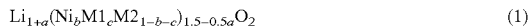

$$Li_{1+a}(Ni_bM1_cM2_{1-b-c})_{1.5-0.5a}O_2 \qquad (1)$$

wherein, M1 represents at least one kind selected from among elements of group 13 to group 15 excluding boron B, or carbon C, or nitrogen N in an extended periodic table of elements, M2 represents at least one kind selected from among elements of group 3 to group 12, and a, b, and c satisfy relationships of $0.95 \leq a \leq 1.05$, $0 < b \leq 0.99$, and $0 < c \leq 0.15$.

According to another embodiment of the present disclosure, there is provided a positive electrode including the above-described positive electrode active material. In addition, according to still another embodiment of the present disclosure, there is provided a lithium ion secondary battery including a positive electrode, a negative electrode, and an electrolytic solution, wherein the positive electrode includes the above-described positive electrode active material. In addition, according to still other embodiments of the present disclosure, there is provided an electric tool, an electric vehicle, and a power storage system, which use the above-described lithium ion secondary battery.

Here, the lithium composite oxide may be a composite oxide including one kind or two kinds or more of transition metals as a constituent element together with lithium Li. The lithium composite oxide may further include another element other than the transition metal element.

The charge capacity vs lithium metal per unit volume of the first lithium composite oxide may be an actual value of an inherent charge performance in the first lithium composite oxide and may be obtained by manufacturing a test secondary battery in which lithium metal is used for a counter electrode. Specifically, a test secondary battery in which the first lithium composite oxide and lithium metal are used for a test electrode and a counter electrode, respectively, may be manufactured, and the secondary battery may be charged and a charge capacity mAh may be measured. Detailed conditions in the case of measuring the charge capacity will be described with reference to examples described later. From a measured charge capacity, a weight g and a true density g/cm$^3$ of the first lithium composite oxide, a charge capacity per unit volume mAh/cm$^3$ of [charge capacity mAh/weight g]×true density g/cm$^3$ may be calculated. In addition, this may be true for a method of calculating a charge capacity vs lithium metal per unit volume of the second lithium composite oxide.

According to the positive electrode active material, the positive electrode, and the lithium ion secondary battery of the embodiments of the present disclosure, the first lithium composite oxide and the second lithium composite oxide expressed by the following formula (1) are included as a positive electrode active material, and a charge capacity vs lithium metal per unit volume of the second lithium composite oxide is larger than that of the first lithium composite oxide. In this case, when a lithium ion secondary battery using the positive electrode active material or the positive electrode is charged and discharged, the second lithium composite oxide is preferentially used during an initial charge and discharge, such that an irreversible capacity is compensated for by the second lithium composite oxide. In addition, during charge and discharge after the initial charge and discharge, the first lithium composite oxide is preferentially used, such that a high battery capacity may be obtained due to the first lithium composite oxide with a high energy density. Furthermore, the second lithium composite oxide includes M1 as a constituent element, such that the generation of oxygen gas is suppressed during charge and discharge. Therefore, a trade-off relationship with respect to a battery capacity characteristic and a gas emission characteristic is broken down, such that an excellent battery capacity characteristic and an excellent gas emission characteristic may be obtained. In addition, in the electric tool, the electric vehicle, and the power storage system, which use the above-described lithium ion secondary battery, the same effect may be obtained.

Additional features and advantages are described herein, and will be apparent from the following Detailed Description and the figures.

DETAILED DESCRIPTION

Figure 1:
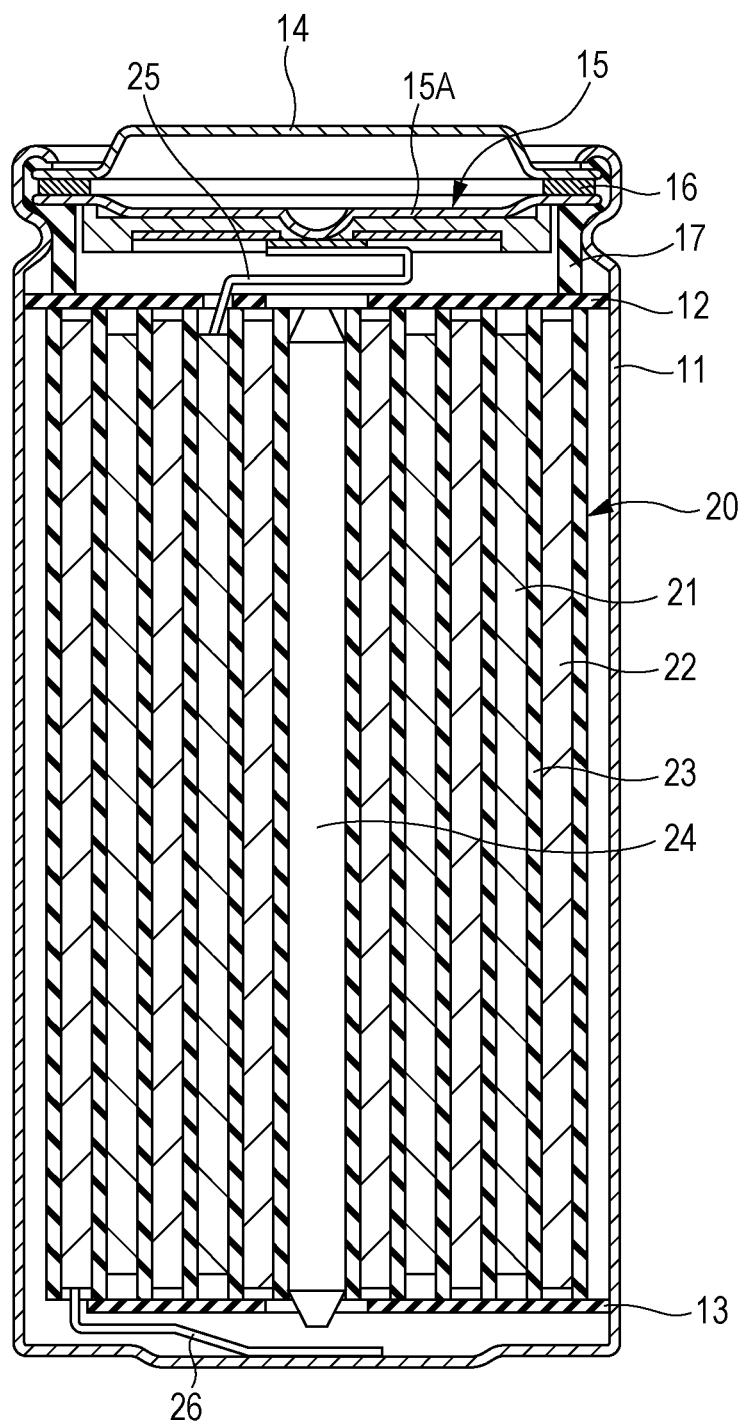
FIG. 1 is a cross-sectional view illustrating a configuration of a lithium ion secondary battery (cylinder type) using a positive electrode active material according to an embodiment of the present disclosure.

The present disclosure will be described in detail with reference to the attached drawings according to an embodiment. In addition, the description will be made in the following order.

1. Positive Electrode Active Material
2. Application Example of Positive Electrode Active Material
2-1. Positive Electrode and Lithium Ion Secondary Battery (Cylinder Type)
2-2. Positive Electrode and Lithium Ion Secondary Battery (Laminated Film Type)
3. Usage of Lithium Ion Secondary Battery 1. Positive Electrode Active Material Configuration of Positive Electrode Active Material A positive electrode active material is used for a positive electrode of, for example, a lithium ion secondary battery (hereinafter, referred to as "secondary battery").

The positive electrode active material includes a first lithium composite oxide and a second lithium composite oxide expressed by the following formula (1). However, a charge capacity vs lithium metal per unit volume of the second lithium composite oxide is larger than that of the first lithium composite oxide.

$$Li_{1+a}(Ni_bM1_cM2_{1-b-c})_{1.5-0.5a}O_2 \quad (1)$$

wherein, M1 represents at least one kind selected from among elements excluding boron B, or carbon C, or nitrogen N of group 13 to group 15 in an extended periodic table of elements, M2 represents at least one kind selected from among elements of group 3 to group 12, and a, b, and c satisfy relationships of $0.95 \le a \le 1.05$, $0 < b \le 0.99$, and $0 < c \le 0.15$.

The first lithium composite oxide is a lithium transition metal composite oxide including one kind or two kinds or more of transition metals or the like together with lithium Li as a constituent element. The kind of the first lithium composite oxide is not limited as long as the first lithium composite oxide is a compound with a charge capacity vs lithium metal per unit volume, which is smaller than that of the second lithium composite oxide.

The first lithium composite oxide in which a charge capacity per unit volume is relatively small is preferentially used in order for a positive electrode active material to occlude and emit lithium ions mainly during charge and discharge after the initial charge and discharge (from a second cycle) of the secondary battery.

Among these, it is preferable that the first lithium composite oxide be at least one kind selected from among compounds expressed by the following formulae (2) to (4). This is because during charge and discharge after the initial charge and discharge, which is performed at the time of actual use of the secondary battery, it is possible to obtain a high energy density (battery capacity) and cycle characteristics are improved.

$$Li_dNi_{1-e-f}Mn_eM3_fO_{2-g}X_h \quad (2)$$

wherein, M3 represents at least one kind selected from among elements of group 2 to group 15 excluding nickel and manganese in an extended periodic table of elements, X represents at least one kind selected from among elements of group 16 and group 17 excluding oxygen O, and d, e, f, g, and h satisfy relationships of $0 \le e \le 1.5$, $0 \le e \le 1$, $0 \le f \le 1$, $-0.1 \le g \le 0.2$, and $0 \le h \le 0.2$.

$$Li_jMn_{2-k}M4_kO_mF_n \quad (3)$$

wherein, M4 represents at least one kind selected from among cobalt, nickel, magnesium Mg, aluminum Al, boron, titanium, vanadium V, chromium Cr, iron, copper, zinc, molybdenum, tin, calcium Ca, strontium Sr, and tungsten W, and j, k, m, and n satisfy relationships of $j \ge 0.9$, $0 \le k \le 0.6$, $3.7 \le m \le 4.1$, and $0 \le n \le 0.1$.

$$Li_pM5_qPO_4 \quad (4)$$

wherein, M5 represents at least one kind selected from among elements of group 2 to group 15 in an extended periodic table of elements, and p and q satisfy relationships of $0 \le p \le 2$, and $0.5 \le q \le 2$.

The compound expressed by formula (2) has a so-called layered form. In formula (2), the kind of M3 is not particularly limited as long as it is at least one kind selected from among elements of group 2 to group 15 in an extended periodic table of elements excluding nickel and manganese, but for example, at least one kind selected from among cobalt, magnesium, aluminum, boron, titanium, vanadium, chromium, iron, copper, zinc, zirconium Zr, molybdenum Mo, tin Sn, calcium, strontium, and tungsten may be exemplified. In addition, the kind of X is not particularly limited as long as it is at least one kind selected from among elements of group 16 and group 17 excluding oxygen, but for example, halogen such as fluorine F may be exemplified. A specific example of the compound expressed by formula (2) includes $LiNiO_2$, $LiCoO_2$, $LiNi_{0.8}CO_{0.18}Al_{0.02}O_2$, or the like.

The compound expressed by formula (3) is a spinel type and includes $LiMn_2O_4$ or the like.

The compound expressed by formula (4) is an olivine type. In formula (4), the kind of M5 is not particularly limited as long as M5 is at least one kind selected from among elements of group 2 to group 15 in an extended periodic table of elements. For example, M5 is at least one kind selected from among cobalt, manganese, iron, nickel, magnesium, aluminum, boron, titanium, vanadium, niobium Nb, copper, zinc, molybdenum, calcium, strontium, tungsten, and zirconium. A specific example of the compound expressed by formula (4) includes $LiFePO_4$ or the like.

The second lithium composite oxide is a lithium-rich composite oxide that includes, as a constituent element, one kind or two or more kinds of non-transition metals M1, and one kind or two or more kinds of transition metals M2. In other words, the second lithium composite oxide is a material in which a part of Ni in lithium-rich $Li_{1+a}NiO_2$ that is a base material is substituted with M1 and M2. In addition, the second lithium composite oxide has substantially the same moisture resistance as $Li_{1+a}NiO_2$ that is a base material, such that the second lithium composite oxide may be applied through an application method or the like in the related art.

The kind of M1 expressed by formula (1) is not particularly limited as long as M1 is at least one kind selected from among elements of group 13 to group 15 excluding boron, or carbon, or nitrogen in an extended periodic table of elements. The kind of M2 is not particularly limited as long as M2 is at least one kind selected from among transition metal elements of group 3 to group 11. In addition, M1 is included in the second lithium composite oxide. On the contrary, M2 is not necessarily included in the second lithium composite oxide.

The second lithium composite oxide having a relatively large charge capacity per unit volume is preferentially used in order for a positive electrode active material to occlude and emit lithium ions during the initial charge and discharge of a secondary battery (first cycle), differently from the first lithium composite oxide. During the initial charge and discharge of the secondary battery, a stable film (SEI film or the like) is formed on a surface of a negative electrode, such that it is known that an irreversible capacity occurs. Along with this, the lithium ions that are occluded and emitted from the first lithium composite oxide during the initial charge and discharge are mainly consumed to form the above-described film (causes an irreversible capacity).

In addition, in a case where the negative electrode active material of the negative electrode is formed of a metal-based material including at least one of silicon and tin as a constituent element, or an oxide thereof (for example SiO or the like), the irreversible capacity may occur. This is because the lithium ions emitted from the positive electrode active material during the initial charge and discharge irreversibly couple with silicon, oxygen, or the like. The above-described metal-based material is, for example, at least one kind selected from among an elementary substance, an alloy, and a compound of silicon, and an elementary substance, an alloy, and a compound of tin, or the like. An oxide of the metal-based material includes, for example, a silicon oxide ($SiO_x$: $0.2 < x < 1.4$).

Among these, it is preferable that M1 expressed by formula (1) be at least one kind selected from among aluminum, silicon, indium In, and tin, and at least one kind of aluminum and silicon is more preferable. This is because this composition has barely any effect on battery capacity and the generation of oxygen gas is suppressed. In addition, it is preferable that M2 is at least one kind selected from among copper, cobalt, manganese, iron, zinc, yttrium Y, titanium, and molybdenum, and at least one kind selected from among copper, cobalt, manganese, iron, zinc, and titanium is more preferable. This is because a charge capacity per unit volume of the second lithium composite oxide is secured.

Here, the reason why the positive electrode active material includes the first and second lithium composite oxide is that during charge and discharge after the initial charge and discharge which is performed at the time of actual use of the secondary battery, it is possible to obtain a high battery capacity through role-sharing of the first and second lithium composite oxides.

More specifically, during the initial charge and discharge, the second lithium composite oxide is preferentially consumed to cause the irreversible capacity. On the contrary, the first lithium composite oxide is maintained while being barely consumed. That is, the second lithium composite oxide performs a function of taking over (compensating) the first lithium composite oxide which is to be originally used to cause the irreversible capacity. In this manner, an absolute amount of the first lithium composite oxide that can be used during charge and discharge after the initial charge and discharge is secured, such that it is possible to stably obtain a high battery capacity by the first lithium composite oxide during charge and discharge after the initial charge and discharge. In this case, the second lithium composite oxide is substantially consumed during the initial charge and discharge, such that it is possible to obtain substantially the same cycle characteristics as a case where only the first lithium composite oxide is used during charge and discharge after the initial charge and discharge without using the second lithium composite oxide.

The above-described advantage is effective in a case where a charge and discharge efficiency in a negative electrode is lower than that in a positive electrode.

More specifically, in a case where a metal-based material is used as the negative electrode active material, to suppress the negative electrode from being intensely expanded and contracted during charge and discharge, it is preferable to lower a utilization ratio of the negative electrode (make a positive electrode capacity lower than a negative electrode capacity). In this case, a ratio of lithium ions consumed in forming an SEI film or the like with respect to a total charge capacity of the negative electrode becomes large, such that the charge and discharge efficiency of the negative electrode decreases. In addition, in a case where an oxide of metal-based material is used as the negative electrode active material, the expansion and contraction of the negative electrode is more suppressed than the case of using the metal-based material, such that it is possible to increase a utilization ratio of the negative electrode, but a portion of the lithium ions irreversibly couples with oxygen during the initial charge and discharge, such that the charge and discharge efficiency of the negative electrode also decreases.

In this regard, when the positive electrode active material includes the first and second lithium composite oxides, as described above, an absolute amount of the first lithium composite oxide that is consumed during the initial charge and discharge is suppressed to be small, and an absolute amount of the first lithium composite oxide that is used for generating a battery capacity during the charge and discharge after the initial charge and discharge is secured. Therefore, even when the charge and discharge efficiency of the negative electrode is low, it is possible to obtain as high a battery capacity as possible. Therefore, the positive electrode active material including the first and second lithium composite oxides is particularly effective in a case where the charge and discharge efficiency of the negative electrode is lower than the charge and discharge efficiency of the positive electrode.

In addition to this, when the positive electrode active material includes the first and the second lithium composite oxides, since the second lithium composite oxide has a discharge capacity of substantially 2.5 V or less vs lithium metal standard potential, a decomposition reaction of the first lithium composite oxide during over-discharge of a secondary battery is suppressed. In addition, in a case where a cobalt-containing oxide (for example, $LiCoO_2$ or the like) is used as the first lithium composite oxide, when a non-cobalt-containing composite oxide is used as the second lithium composite oxide, a use amount of expensive cobalt decreases, such that an advantage from the viewpoint of cost may be obtained.

The reason why a charge capacity vs lithium metal per unit volume is larger in the second lithium composite oxide compared to the first lithium composite oxide is that the second lithium composite oxide is preferentially consumed rather than the first lithium composite oxide to form a film (cause an irreversible capacity) during the initial charge and discharge, such that an amount of consumption of the second lithium composite oxide may be small. In this manner, an absolute amount (occupancy with respect to the entirety of the positive electrode active material) of the first lithium composite oxide that can be used to obtain a battery capacity during charge and discharge after the initial charge and discharge is secured, such that the battery capacity increases. As described for reference, a charge capacity per unit volume (a cut-off voltage during charge=4.3 V) is substantially 800 to 1000 mAh/cm$^3$ in the first lithium composite oxide ($LiNiO_2$ or $LiCoO_2$), and the charge capacity per unit volume is substantially 1300 to 1451 mAh/cm$^3$ in the base material ($Li_2NiO_2$) of the second lithium composite oxide.

The reason why the second lithium composite oxide includes M1 as a constituent element is that the generation of the oxygen gas is more suppressed during a charge and discharge compared to a case where M1 is not included.

Specifically, in regard to lithium-rich $Li_2NiO_2$ or the like, when one or more lithium ion per one molecule is de-intercalated during charge and discharge, $Ni_2O$ is generated. This $Ni_2O$ is unstable from the viewpoint of structure, such that $Ni_2O$ is apt to be decomposed into NiO and $O_2$ through a self-decomposition reaction. Therefore, when a positive electrode potential vs lithium metal standard potential of a positive electrode is higher than substantially 3.8 V, the oxygen gas is generated at the positive electrode. This oxygen gas may cause the generation of swelling in a battery, and decrease in a battery characteristic (load characteristic or the like) and in safety, as well as abnormal stopping of a charge and discharge due to the blocking of a conduction path. In this regard, in the second lithium composite oxide including M1 as a constituent element, the self-decomposition reaction of $Ni_2O$ is suppressed, such that it becomes difficult for the oxygen gas to be generated.

In the second lithium composite oxide, it is preferable that a ratio c of M1 with respect to components ($Ni_bM1_cM2_{1-b-c}$) other than lithium and oxygen be 15% or less in a mole ratio, and more preferably 1 to 15%. This is because a battery capacity does not significantly decrease, and the self-decomposition reaction of $Ni_2O$ is suppressed. When the ratio of M1 exceeds 15%, a ratio of Ni or the like relatively decreases, such that the battery capacity may excessively decrease. In addition, when the second lithium composite oxide is formed, even when a baking temperature described below is adjusted, a charge capacity per unit volume may become higher compared to the first lithium composite oxide. On the other hand, when the ratio of M1 is less than 1%, M1 is too small, such that the self-decomposition reaction of $Ni_2O$ may not be suppressed sufficiently.

The reason why the second lithium composite oxide includes Ni as a requisite constituent element is that the self-decomposition reaction of the second lithium composite oxide is suppressed during oxidation and reduction from the viewpoint of valence-compensation compared to a case where Cu or the like is included as a requisite constituent element, such that the generation of oxygen gas becomes difficult. In addition, the reason why the second lithium composite oxide includes M2 as a constituent element is that a charge capacity per unit volume of the first lithium composite oxide increases to compensate for an irreversible capacity.

In addition, the second lithium composite oxide is formed, for example, by mixing raw materials (two kinds or more of oxide including Li, Ni, M1, and M2), and by baking the resultant mixture at a predetermined temperature (a baking temperature). This baking temperature may determine whether the second lithium composite oxide having a stable crystalline structure may be formed, but also has an effect on a charge capacity vs lithium metal per unit volume of the second lithium composite oxide. Therefore, to make the charge capacity per unit volume of the second lithium composite oxide higher than that of the first lithium composite oxide, it is necessary to appropriately set the baking temperature. This appropriate baking temperature is, for example, 600 to 830° C. When the baking temperature is lower than 600° C., crystallinity of the second lithium composite oxide is deteriorated, such that oxygen gas may be generated during charge and discharge. On the other hand, when the baking temperature is higher than 830° C., oxides (for example, NiO or the like) of the raw materials become stable, such that it may be difficult to form the second lithium composite oxide.

The above-described characteristic value of the first lithium composite oxide, that is, the charge capacity vs lithium metal per unit volume is an actual value of an inherent charge capacity in the first lithium composite oxide, such that it is possible to obtain this capacity by manufacturing a test secondary battery in which lithium metal is used as a counter electrode. In addition, a characteristic value of the second lithium composite oxide is also obtained by the same sequence.

In a case of obtaining a charge capacity per unit volume, a test secondary battery in which the first lithium composite oxide and lithium metal are used for a test electrode and a counter electrode, respectively, is manufactured, and then the secondary battery is charged, and then a charge capacity mAh is measured. From the measured charge capacity, a weight g and a true density $g/cm^3$ of the first lithium composite oxide, a charge capacity per unit volume $mAh/cm^3$ of [charge capacity mAh/weight g]×true density $g/cm^3$ is calculated. Measurement conditions of the charge capacity mAh will be described with reference to examples described later.

In addition, in a case where the positive electrode active material is assembled to the secondary battery, as described below, it is preferable that characteristic values of the first and second lithium composite oxides be investigated in a region where charge and discharge does not occur due to an insulating protective tape that is provided at the center of the positive electrode. In this region, a state before charge and discharge (not charged and discharged state) is maintained, such that it is possible to investigate characteristic values of the first and second lithium composite oxides regardless of whether or not charge and discharge occurs.

A mixing ratio of the first and second lithium composite oxides is not particularly limited, but it is preferable that a proportion of the first lithium composite oxide be larger than that of the second lithium composite oxide. This is because during the initial charge and discharge, it is necessary to stably obtain a high battery capacity during charge and discharge after the initial charge and discharge by the sufficient amount of second lithium composite oxide while compensating for an irreversible capacity by the smallest amount of the second lithium composite oxide.

More specifically, in a case where an irreversible capacity generated in the negative electrode during the initial charge and discharge is Z % with respect to a total charge capacity vs positive electrode of the negative electrode, it is preferable that a ratio of the second lithium composite oxide with respect to the first and second lithium composite oxides be set in such a manner that a charge capacity vs negative electrode of the second lithium composite oxide becomes Z % or less with respect to a total charge capacity of the positive electrode. For example, when the irreversible capacity is 30% with respect to the total charge capacity of the negative electrode, it is preferable that the proportion of the second lithium composite oxide be set in such a manner that the charge capacity becomes 30% or less with respect to the total charge capacity of the positive electrode.

Method of Analyzing Positive Electrode Active Material

To confirm that the positive electrode active material includes the first and second lithium composite oxide, the positive electrode active material may be analyzed using various element analyzing methods. These element analyzing methods include, for example, an X-ray diffraction (XRD) method, an inductively coupled plasma (ICP) emission spectral analysis, Raman spectroscopy, energy dispersive X-ray spectrometry (EDX), or the like.

In addition, in regard to the secondary battery, in a region where charge and discharge is performed (a region where the positive electrode and the negative electrode are opposite to each other), since a crystalline structure of the first and second lithium composite oxides is changed due to charge and discharge, there is a possibility that the crystalline structure of the first and second lithium composite oxides before and after charge and discharge may not be confirmed through the X-ray diffraction method or the like. However, in a case where a region (a non-charged-discharged region) in which charge and discharge is not performed is present in the positive electrode, it is preferable to perform an element analysis in that region. This is because a crystalline structure before charge and discharge is maintained in the non-charged-discharged region, such that it is possible to analyze a composition of the positive electrode active material regardless of whether or not charge and discharge is performed. This "non-charged-discharged region" includes a region where, for example, an insulating protective tape is attached on a surface of an end portion of the positive electrode (positive electrode active material layer) for securing safety, such that charge and discharge is not performed between the positive electrode and the negative electrode due to the insulating protective tape.

Use Condition of Positive Electrode Active Material

In a case where the secondary battery using the positive electrode active material is charged and discharged, a charge voltage during an initial charge and a charge voltage during charge after the initial charge may be set equally to each other. In addition, the charge voltage during the initial charge may be set to be higher than that during charge after the initial charge. This is because in the latter case, during the initial charge and discharge, it is easy for a lithium-rich second lithium composite oxide to be consumed preferentially and sufficiently to cause an irreversible capacity of the negative electrode. However, to suppress a decomposition reaction of the second lithium composite oxide, it is preferable that the charge voltage during the initial charge be 4.6 V or less.

Operation and Effect of Positive Electrode Active Material

According to the positive electrode active material, the first lithium composite oxide and the second lithium composite oxide expressed by formula (1) are included, and the charge capacity vs lithium metal per unit volume is larger in the second lithium composite oxide compared to the first lithium composite oxide. In this case, when a lithium ion secondary battery using the positive electrode active material is charged and discharged, the irreversible capacity is compensated for by the second lithium composite oxide during an initial charge and discharge, and a high battery capacity may be obtained by the first lithium composite oxide during charge and discharge after the initial charge and discharge. In addition, the second lithium composite oxide includes M1 as a constituent element, the generation of oxygen gas is suppressed during charge and discharge. Therefore, the trade-off relationship with respect to a battery capacity characteristic and a gas emission characteristic is broken down, such that an excellent battery capacity characteristic and an excellent gas emission characteristic may be obtained.

2. Application Example of Positive Electrode Active Material

Next, an application example of the above-described positive electrode active material will be described. This positive electrode active material is used for, for example, a positive electrode of a lithium ion secondary battery.

2-1. Positive Electrode and Lithium Ion Secondary Battery (Cylinder Type)

Figure 2:
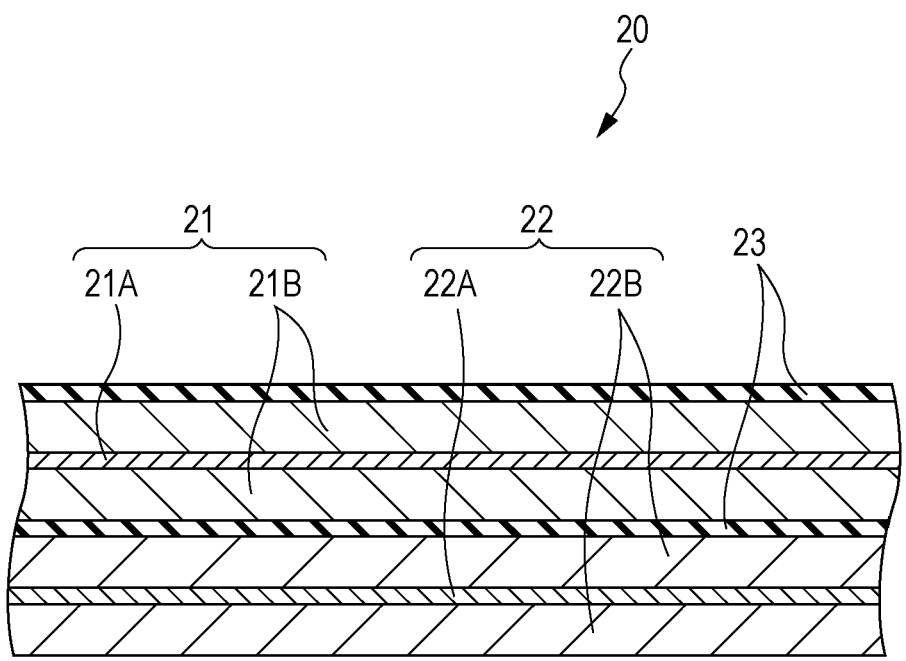
FIG. 2 is an enlarged cross-sectional view illustrating a part of a wound electrode body shown in FIG. 1.

FIGS. 1 and 2 illustrate a cross-sectional configuration of a cylinder-type lithium ion secondary battery that is an example of a secondary battery, and FIG. 2 illustrates an enlarged part of a wound electrode body 20 shown in FIG. 1.

Overall Configuration of Secondary Battery

The secondary battery mainly includes the wound electrode body 20 and a pair of insulating plates 12 and 13 which are accommodated inside a hollow columnar battery casing 11. The wound electrode body 20 is a winding obtained by laminating a positive electrode 21 and a negative electrode 22 with a separator 23 interposed therebetween and by winding this resultant laminated body.

The battery casing 11 has a hollow structure in which one end portion is closed and the other end portion is opened, and is formed of, for example, iron, aluminum, an alloy thereof, or the like. In addition, in a case where the battery casing 11 is formed of iron, nickel or the like may be plated on a surface of the battery casing 11. The pair of insulating plates 12 and 13 is disposed so as to extend in a direction orthogonal to a winding circumferential surface with the wound electrode body 20 interposed therebetween in a vertical direction.

At the opened end portion of the battery casing 11, a battery lid 14, a safety valve mechanism 15, and a PTC (positive temperature coefficient) element 16 are caulked through a gasket 17. In this manner, the battery casing 11 is sealed. The battery lid 14 is formed of, for example, the same material as that of the battery casing 11. The safety valve mechanism 15 and the PTC element 16 are provided at an inner side of the battery lid 14, and the safety valve mechanism 15 is electrically connected to the battery lid 14 through the PTC element 16. The safety valve mechanism 15 is configured in such a manner that when an internal pressure becomes a predetermined value or more due to a short circuit, heating from outside, or the like, a disc plate 15A is inverted and the electrical connection between the battery lid 14 and the wound electrode body 20 is disconnected. The PTC element 16 prevents abnormal heat generation caused by a large current through an increase in resistance corresponding to a temperature rising. The gasket 17 is formed of, for example, an insulating material, and asphalt may be applied on a surface thereof.

At the center of the wound electrode body 20, a center pin 24 may be inserted. A positive electrode lead 25 formed of a conductive material such as aluminum is connected to the positive electrode 21, and a negative electrode lead 26 formed of a conductive material such as nickel is connected to the negative electrode 22. The positive electrode lead 25 is connected to the safety valve mechanism 15 through a welding or the like, and is electrically connected to the battery lid 14. The negative electrode lead 26 is connected to the battery casing 11 through a welding or the like, and is electrically connected thereto.

Positive Electrode

The positive electrode 21 includes a positive electrode current collector 21A and a positive electrode active material layer 21B provided on a surface or both surfaces of the positive electrode current collector 21A. The positive electrode current collector 21A is formed of a conductive material such as aluminum, nickel, and stainless steel. The positive electrode active material layer 21B includes the above described positive electrode active material (first and second lithium composite oxides), and may include another material such as a positive electrode binding agent or a positive electrode conducting agent according to necessity.

The positive electrode binding agent includes any one kind or two kinds or more of synthetic rubber, a polymer material, or the like. The synthetic rubber includes, for example, styrene butadiene-based rubber, fluorine-based rubber, ethylene propylene diene, or the like. The polymer material includes, for example, polyvinylidene fluoride, polyimide, or the like.

The positive electrode conducting agent includes, for example, any one kind or two kinds or more of a carbon material or the like. The carbon material includes, for example, graphite, carbon black, acetylene black, ketjen black, or the like. In addition, the positive electrode conducting agent may be a metallic material, a conductive polymer, or the like as long as this material has conductivity.

Negative Electrode

The negative electrode 22 includes, for example, a negative electrode current collector 22A and a negative electrode active material 22B provided on one surface or both surfaces of the negative electrode current collector 22A.

The negative electrode current collector 22A is formed of a conductive material such as copper, nickel, and stainless steel. It is preferable that a surface of the negative electrode current collector 22A be roughened. This is because an adhesion property between the negative electrode current collector 22A and the negative electrode active material layer 22B is improved due to a so-called anchor effect. In this case, a region, which is opposite to at least the negative electrode active material layer 22B, in a surface of the negative electrode current collector 22A may be roughened. As a roughening method, for example, a method of forming a particulate material through an electrolytic treatment, or the like may be exemplified. This electrolytic treatment is a method of providing concavities and convexities by forming the particulate material on the negative electrode current collector 22A in an electrolytic bath through an electrolytic method. Copper foil formed through the electrolytic method is generally called electrolytic copper foil.

The negative electrode active material layer 22B includes, as a negative electrode active material, any one kind or two or more kinds of negative electrode materials that can occlude and emit lithium ions, and may include another material such as a negative electrode binding agent and a negative electrode conducting agent according to necessity. In addition, details of the negative electrode binding agent and the negative electrode conducting agent are the same as those of the positive electrode binding agent and the positive electrode conducting agent, for example. In the negative electrode active material layer 22B, it is preferable that a chargeable capacity of the negative electrode material be larger than a discharge capacity of the positive electrode 21 to prevent lithium metal from being precipitated unintentionally during charge and discharge.

The negative electrode material includes, for example, a carbon material. This is because variation in a crystalline structure during occluding and emitting of lithium ions is very small, and therefore it is possible to obtain a high energy density and excellent cycle characteristics. In addition, this is because the carbon material also functions as the negative electrode conducting agent. As the carbon material, for example, easy-graphitization carbon, non-graphitization carbon in which a plane spacing of (002) plane is 0.37 nm or more, graphite in which a plane spacing of (002) plane is 0.34 nm or less, or the like may be exemplified. More specifically, pyrolytic carbon, coke, glassy carbon fiber, organic polymer compound baked body, activated charcoal, carbon black, or the like may be exemplified. Among these, as the coke, pitch coke, needle coke, petroleum coke, or the like may be exemplified. In regard to a carbon material other than phenol, the organic polymer compound baked body may include low crystalline carbon or amorphous carbon that is subjected to a heat treatment at a temperature of approximately 1000° C. or less, and represents a polymer material such as a phenol resin and a furan resin that is baked at an appropriate high temperature and carbonized. The organic polymer compound baked body represents a polymer material obtained by baking and carbonizing a resin or a furan resin at an appropriate high temperature. In addition to this, the carbon material may be low crystalline carbon or amorphous carbon that is subjected to a heat treatment at a temperature of 1000° C. or less. In addition, the form of the carbon material may be a fiber shape, a spherical shape, a powder form, or a squamous form.

In addition, the negative electrode material is a material (metal-based material) including any one kind or two or more kinds of a metal element and a metalloid element as a constituent element. This is because a high energy density may be obtained. This metal-based material may be an elementary substance of the metal element or metalloid element, an alloy or a compound thereof, or two kinds or more of these. Furthermore, at least a part of the metal-based material may include one kind or two kinds or more of these. In addition, the alloy according to an embodiment of the present disclosure also includes a material including one kind or more of metal elements and one kind or more of metalloid elements in addition to a material including two or more kinds of metal elements. The alloy may include non-metal elements. A solid solution, a eutectoid (eutectic mixture), an intermetallic compound, two kinds or more of coexisting materials thereof, or the like are present in a structure of the alloy.

The above-described metal element or metalloid element is a metal element or metalloid element that can form an alloy together with, for example, lithium, and specifically, includes one kind or two kinds or more of the following elements: magnesium, boron, aluminum, gallium, indium, silicon, germanium Ge, tin, lead Pb, bismuth Bi, cadmium Cd, silver Ag, zinc, hafnium Hf, zirconium, yttrium, palladium Pd, or platinum Pt. Among these, it is preferable to include at least one of silicon and tin. This is because silicon and tin have an excellent capability of occluding and emitting lithium ions, such that a high energy density may be obtained.

A material including at least one of silicon and tin as a constituent element may be an elementary substance of silicon or tin, an alloy or a compound thereof, or two kinds or more of these. Furthermore, at least a part of the metal-based material may include one kind or two kinds or more of these phases. In addition, the elementary substance means an elementary substance (may include a slight amount of impurity) from the viewpoint of general implication, and does not necessarily mean to have a purity of 100%.

The alloy of silicon includes a material including one kind or two kinds or more of the following elements as a constituent element other than silicon: tin, nickel, copper, iron, cobalt, manganese, zinc, indium, silver, titanium, germanium, bismuth, antimony, or chromium. As the compound of silicon, for example, a material including oxygen or carbon as a constituent element other than silicon may be exemplified. In addition, the compound of silicon may include, for example, one kind or two kinds or more of elements described above with respect to the alloy of silicon as a constituent element other than silicon.

The alloy or compound of silicon includes, for example, the following materials or the like: $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v(0<v\leq2)$, or $LiSiO$. In addition, in $SiO_v$, v may be in a range of $0.2<v<1.4$.

The alloy of tin includes a material including one kind or two kinds or more of the following elements as a constituent element other than tin: silicon, nickel, copper, iron, cobalt, manganese, zinc, indium, silver, titanium, germanium, bismuth, antimony, or chromium. As the compound of tin, for example, a material including oxygen or carbon as a constituent element may be exemplified. In addition, the compound of tin may include, for example, one kind or two kinds or more of elements described above with respect to the alloy of tin as a constituent element other than tin. As the alloy or compound of tin, for example, $SnO_w (0<w\leq2)$, $SnSiO_3$, $LiSnO$, $Mg_2Sn$, or the like may be exemplified.

In addition, as the material including tin, for example, a material, which includes tin as a first constituent element and includes second and third constituent elements, is preferable. The second constituent element includes, for example, one kind or two kinds or more of the following elements: cobalt, iron, magnesium, titanium, vanadium, chromium, manganese, nickel, copper, zinc, gallium, zirconium, niobium, molybdenum, silver, indium, cerium Ce, hafnium, tantalum, tungsten W, bismuth, or silicon. The third constituent element includes, for example, one kind or two kinds or more of boron, carbon, aluminum, and phosphorus. When the material includes the second and third constituent elements, it is possible to obtain a high battery capacity and excellent cycle characteristics, such that this material is preferable.

Among these, a material (SnCoC-containing material) including tin, cobalt, and carbon is preferable. As a composition of the SnCoC-containing material, for example, there is a composition in which a content of carbon is 9.9 to 29.7 mass %, and a ratio (Co/(Sn+Co)) of a content of tin and a content of cobalt is 20 to 70 mass %. This is because within this composition range, a high energy density may be obtained.

This SnCoC-containing material has a phase including tin, cobalt, and carbon, and it is preferable that the phase have a low crystalline structure or an amorphous structure. This phase is a reaction phase that can react with lithium, and it is possible to obtain an excellent characteristic due to the presence of the reaction phase. It is preferable that a half width of a diffraction peak that can be obtained by an X-ray diffraction be 1.0° or more at a diffraction angle 2θ in a case where CuKα rays are used as specific X-rays and a sweeping velocity is set to 1.0°/min. This is because lithium ions are relatively smoothly occluded and emitted, and a reaction property of the lithium ions with an electrolytic solution decreases. In addition, the SnCoC-containing material may have a phase including an elementary substance or a part of each constituent element in addition to the low crystalline phase or the amorphous phase.

It is possible to easily determine whether or not a diffraction peak that can be obtained by X-ray diffraction corresponds to the reaction phase that can react with lithium by comparing X-ray diffraction charts before and after an electrochemical reaction with lithium. For example, in a case where the diffraction peak varies before and after the electrochemical reaction with lithium, this corresponds to the reaction phase that can react with lithium. In this case, for example, the diffraction peak of the low crystalline or amorphous reaction phase is shown in a range of 2θ=20° to 50°. This is considered to be because the reaction phase includes, for example, each constituent element described above, and is crystallized to a low degree or becomes amorphous due to the presence of carbon.

In the SnCoC-containing material, it is preferable that at least a part of carbon that is a constituent element couple with a metal element or a metalloid element. This is because agglomeration or crystallization of tin or the like is suppressed. It is possible to confirm a coupling state of elements through X-ray photoelectron spectroscopy (XPS). In an apparatus available in the market, for example, as soft X-rays, Al—Kα rays, Mg—Kα rays, or the like are used. In a case where at least a part of carbon is coupled with a metal element, metalloid element, or the like, a peak of a synthetic wave of the 1s orbital (C1s) of carbon appears at a region lower than 284.5 eV. In addition, it is assumed that energy correction is performed such that a peak of the 4f orbital (Au4f) of gold is obtained at 84.0 eV. At this time, commonly, surface contamination carbon is present on a material surface, such that a peak of C1s of carbon is set to 284.8 eV, and this is made as an energy reference. In an XPS measurement, a waveform of a peak of C1s is obtained in a shape including a peak of the surface contamination carbon and a peak of carbon in the SnCoC-containing material, such that, for example, analysis is performed using software available in the market and both peaks are separated. In analysis of a waveform, a location of a main peak that is present at the side of the lowest binding energy is set as an energy reference (284.8 eV).

In addition, the SnCoC-containing material may further include another constituent element according to necessity. As this other constituent element, one kind or two kinds or more of silicon, iron, nickel, chromium, indium, niobium, germanium, titanium, molybdenum, aluminum, phosphorous, gallium, and bismuth may be exemplified.

A material containing tin, cobalt, iron, and carbon (SnCoFeC-containing material) other than the SnCoC-containing material is also preferable. A composition of this SnCoFeC-containing material may be arbitrary set. For example, in a case where the content of iron is set to be small, the composition is as follows. The content of carbon is 9.9 to 29.7 mass %, the content of iron is 0.3 to 5.9 mass %, the ratio (Co/(Sn+Co)) of the content of tin and the content of cobalt is 30 to 70 mass %. In addition, for example, in a case where the content of iron is set with an extra amount, the composition thereof is as follows. The content of carbon is 11.9 to 29.7 mass %. In addition, the ratio ((Co+Fe)/(Sn+Co+Fe)) of the content of tin, the content of cobalt, and the content of iron is 26.4 to 48.5 mass %, and the ratio (Co/(Co+Fe)) of the content of cobalt and the content of iron is 9.9 to 79.5 mass %. This is because within this composition range, a high energy density may be obtained. A physical property (half width or the like) of the SnCoFeC-containing material is the same as that of the above-described SnCoC-containing material.

In addition, as a material of the negative electrode, a metal oxide, a polymer compound, or the like may be exemplified. As the metal oxide, for example, an iron oxide, a ruthenium oxide, a molybdenum oxide, or the like may be exemplified. As the polymer compound, for example, polyacetylene, polyaniline, polypyrrole, or the like may be exemplified.

The negative electrode active material layer 22B may be formed through, for example, an application method, a gas phase method, a liquid phase method, a thermal spraying method, a baking method (sintering method), or two kinds or more thereof. The application method is a method in which a particulate negative electrode active material is mixed with a binding agent or the like, the resultant mixture is dispersed in a solvent such as an organic solvent, and the resultant dispersed solution is applied. As the vapor phase method, for example, a physical deposition method, a chemical deposition method, or the like may be exemplified. Specifically, a vacuum deposition method, a sputtering method, an ion plating method, a laser ablation method, a thermal chemical vapor deposition, a chemical vapor deposition (CVD) method, a plasma chemical vapor deposition method, or the like may be exemplified. As the liquid phase method, an electroplating method, an electroless plating method, or the like may be exemplified. The thermal spraying method is a method in which the negative electrode active material is sprayed in a molten state or a semi-molten state. The baking method is a method in which application is performed by the same sequence as that of the application method, and then a heat treatment at a temperature higher than that of the binding agent or the like is performed. In regard to the baking method, a known method may be used, and, for example, an atmospheric baking method, a reaction baking method, a hot press baking method, or the like may be exemplified.

The porosity (volume %) of the negative electrode active material layer 22B is not particularly limited, but it is preferable that the porosity is 30% or less. This is because the surface area of the negative electrode active layer 22B is suppressed to be sufficiently small, and therefore during charge, decomposition of the electrolytic solution and oxidation of the negative electrode active material layer 22B due to oxygen gas generated from the positive electrode 21 is suppressed, and as a result thereof, it is difficult for a battery capacity to decrease. This porosity is determined by a pressing pressure during a compression-molding of the negative electrode active material layer 22B. In addition, the porosity is calculated based on thickness and weight of a negative electrode active material layer, and the true density of each material included in the negative electrode active material.

Separator

The separator 23 isolates the positive electrode 21 and the negative electrode 22, and allows lithium ions to pass therethrough while preventing a short circuit of a current caused by a contact between both electrodes. A liquid electrolyte (electrolytic solution) is impregnated in the separator 23. The separator 23 is formed of a porous film or the like including, for example, a synthetic resin or ceramic, and may have a structure in which two kinds or more of these porous films are laminated. As the synthetic resin, for example, polytetrafluoroethylene, polypropylene, or polyethylene, or the like may be exemplified.

Electrolytic Solution

This electrolytic solution includes a solvent, and an electrolytic salt that is dissolved in the solvent.

The solvent includes, for example, one kind or two kinds or more of the following nonaqueous solvents (organic solvents): ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethyl acetate, ethyl trimethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide. This is because an excellent battery capacity, excellent cycle characteristics, and excellent storage characteristics may be obtained.

Among these, at least one kind selected from among ethylene carbonate, propylene carbonate, dimethyl carbonate, diethyl carbonate, and ethyl methyl carbonate is preferable. This is because relatively excellent characteristics may be obtained. In this case, a combination of a solvent having high viscosity (high dielectric constant) (for example, specific dielectric constant $\in \geq 30$) such as ethylene carbonate and propylene carbonate, and a solvent having low viscosity (for example, viscosity $\leq 1$ mPa·s) such as dimethyl carbonate, ethyl methyl carbonate, and diethyl carbonate may be used. This is because dissociation of the electrolyte salt and mobility of ions are improved.

Particularly, the solvent may be cyclic carboxylic acid ester (unsaturated carbon bond cyclic carboxylic acid ester) having one or two or more unsaturated carbon bonds. This is because during charge and discharge, a stable protective film is formed on a surface of the negative electrode 22, such that a decomposition reaction of the electrolytic solution is suppressed. As the unsaturated carbon bond cyclic carboxylic acid ester, for example, vinylene carbonate, vinyl ethylene carbonate, or the like may be exemplified. In addition, the content of the unsaturated carbon bond cyclic carboxylic acid ester in a nonaqueous solvent is, for example, 0.01 to 10 wt %. This is because the battery capacity is not decreased so much, and a decomposition reaction of the electrolytic solution is suppressed.

In addition, the solvent may be at least one kind of chain carboxylic acid ester (halogenated chain carbonic acid ester) having one or two or more of halogen groups, and cyclic carboxylic acid ester (halogenated cyclic carboxylic acid ester) having one or two or more halogen groups. This is because during charge and discharge, a stable protective film is formed on a surface of the negative electrode 22, such that the decomposition reaction of the electrolytic solution is suppressed. The kinds of the halogen groups are not particularly limited, but among these, a fluorine group, a chlorine group, or a bromine group is preferable, and the fluorine group is more preferable. This is because a high effectiveness may be obtained. However, as the number of halogen groups, two is preferable rather than one, and the number of halogen groups may be three or more. This is because a relatively strong and stable protective film is formed, such that a decomposition reaction of the electrolytic solution is more suppressed. As the halogenated chain carboxylic acid ester, for example, fluoromethyl methyl carbonate, bis(fluoromethyl) carbonate, difluoromethyl methyl carbonate, or the like may be exemplified. As the halogenated cyclic carboxylic acid ester, 4-fluoro-1,3-dioxolane-2-one, 4,5-difluoro-1,3-dioxolane-2-one, or the like may be exemplified. In addition, the content of the halogenated chain carbonic ester and the halogenated cyclic carbonic ester in a nonaqueous solvent is, for example, 0.01 to 50 wt %. This is because the battery capacity is not decreased so much, and the decomposition reaction of the electrolytic solution is suppressed.

In addition, the solvent may be a sultone (cyclic sulfonic acid ester). This is because a chemical target stability of the electrolytic solution is improved. As the sultone, for example, propane sultone, propene sultone, or the like may be exemplified. In addition, the content of the sultone in a nonaqueous solvent is, for example, 0.5 to 5 wt %. This is because the battery capacity is not decreased so much, and the decomposition reaction of the electrolyte is suppressed.

In addition, the solvent may be an acid anhydride. This is because the chemical target stability of the electrolytic solution is more improved. As the acid anhydride, for example, dicarboxylic acid anhydride, disulfonic acid anhydride, carboxylic acid sulfonic acid anhydride, or the like may be exemplified. As the dicarboxylic acid anhydride, for example, succinic anhydride, glutaric anhydride, maleic anhydride, or the like may be exemplified. As the disulfonic acid anhydride, for example, ethane sulfonic anhydride, propane disulfonic anhydride, or the like may be exemplified. As the carboxylic acid anhydride, for example, sulfobenzoic acid anhydride, sulfopropionic acid anhydride, sulfobutyric acid anhydride, or the like may be exemplified. In addition, the content of the acid anhydride in a nonaqueous solvent is, for example, 0.5 to 5 wt %. This is because the battery capacity is not decreased so much, and the decomposition reaction of the electrolytic solution is suppressed.

Electrolyte Salt

An electrolyte salt is one kind or two or more kinds of lithium salt described later. However, the electrolyte salt may be another salt (for example, light metal lithium salt) other than the lithium salt.

As the lithium salt, for example, the following compounds or the like may be exemplified: lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride ($LiCl$), or lithium bromide ($LiBr$). This is because an excellent battery capacity, excellent cycle characteristics, and excellent storage characteristics may be obtained.

Among these, at least one of lithium hexafluorophosphate, lithium tetrafluoroborate, lithium perchlorate, and lithium hexafluoroarsenate is preferable, and lithium hexafluorophosphate is more preferable. This is because internal resistance decreases, such that a relatively high effectiveness may be obtained.

It is preferable that the content of the electrolyte salt be 0.3 to 3.0 mol/kg with respect to a solvent. This is because high ion conductivity may be obtained.

In addition, the electrolytic solution may include various additives together with the solvent and the electrolytic salt. The kind of these additives is not particularly limited, but may be for example, heteropoly acid or a compound thereof (hereinafter, referred to as "heteropoly acid or the like"). This is because heteropoly acid or the like has a property of absorbing oxygen gas, such that during charge and discharge, the generation amount of oxygen gas is relatively reduced. As the heteropoly acid or the like, for example, tungstosilicic acid ($H_4[SiW_{12}O_{40}] \cdot nH_2O$: $n \approx 30$) or the like may be exemplified. However, the additive such as heteropoly acid or the like may be included in at least one of the positive electrode 21, the negative electrode 22, and the electrolytic solution.

Operation of Secondary Battery

In this secondary battery, for example, during charge, lithium ions emitted from the positive electrode 21 are occluded in the negative electrode 22 through the electrolytic solution. In addition, for example, during discharge, lithium ions emitted from the negative electrode 22 are occluded in the positive electrode 21 through the electrolytic solution.

Method of Manufacturing Secondary Battery

This secondary battery is manufactured, for example, by the following sequence.

First, the positive electrode 21 is manufactured. At first, a positive electrode active material (first and second lithium composite oxides), and a positive electrode binding agent, a positive electrode conducting agent, or the like, as necessary, are mixed to produce a paste-type positive electrode mixture. Then, this positive electrode mixture is dispersed in an organic solvent or the like and thereby a positive electrode mixture slurry is obtained. Subsequently, this positive electrode mixture slurry is applied onto both surfaces of the positive electrode current collector 21A and is dried, and thereby the positive electrode active material layer 21B is formed. Finally, the positive electrode active material layer 21B is compression-molded by a roll pressing machine or the like while being heated according to necessity. In this case, this compression molding may be performed plural times.

Next, the negative electrode 22 is manufactured in the same sequence as that of the positive electrode 21. In this case, a negative electrode active material, and a negative electrode binding agent, a negative electrode conducting agent, or the like, as necessary, are mixed to produce a negative electrode mixture. Then, this negative electrode mixture is dispersed in an organic solvent or the like and thereby a paste-type negative electrode mixture slurry is obtained. Subsequently, this negative electrode mixture slurry is applied onto both surfaces of the negative electrode current collector 22A and is dried, and thereby the negative electrode active material layer 22B is formed. Then, the negative electrode active material layer 22B is compression-molded according to necessity.

In addition, the negative electrode 22 may be manufactured by a sequence different from the sequence in the positive electrode 21. In this case, for example, a negative electrode material is deposited on both surfaces of the negative electrode current collector 22A by using a vapor phase method such a deposition method, and thereby the negative electrode active material layer 22B is formed.

Finally, a secondary battery is assembled using the positive electrode 21 and the negative electrode 22. First, the positive electrode lead 25 is attached to the positive electrode current collector 21A through a welding or the like, and the negative electrode lead 26 is attached to the negative electrode current collector 22A through a welding or the like. Subsequently, the positive electrode 21 and the negative electrode 22 are laminated with the separator 23 interposed therebetween, and are wound to form the wound electrode body 20. Then, the center pin 24 is inserted into the wound electrode body 20 at the winding center thereof. Subsequently, the wound electrode body 20 is accommodated inside the battery casing 11 while being interposed between the pair of insulating plates 12 and 13. In this case, a front end portion of the positive electrode lead 25 is attached to the safety valve mechanism 15 through a welding or the like, and a front end portion of the negative electrode lead 26 is attached to the battery casing 11 through a welding or the like. Subsequently, an electrolytic solution is injected into the inside of the battery casing 11, and is impregnated in the separator 23. Finally, the battery lid 14, the safety valve mechanism 15, and the PTC element 16 are caulked to an opening end portion of the battery casing 11 with the gasket 17 interposed therebetween. In this manner, a secondary battery shown in FIGS. 1 and 2 is manufactured.

Operation and Effect of Secondary Battery

According to this cylinder type lithium ion secondary battery, the positive electrode active material layer 21B of the positive electrode 21 includes the positive electrode active material (first and second lithium composite oxides), such that it is possible to obtain a high battery capacity and the generation of oxygen gas is suppressed. Therefore, it is possible to obtain an excellent battery capacity characteristic and an excellent gas emission characteristic.

Particularly, in a case where a material in which an irreversible capacity becomes large is used as the negative electrode active material of the negative electrode 22, it is possible to obtain a relative high effectiveness. As this material, a material including at least one of silicon and tin as a constituent element (particularly, silicon oxide ($SiO_x$: $0.2<x<1.4$)), a carbon material (low crystalline carbon or amorphous carbon), or the like may be exemplified.

2-2. Positive Electrode and Lithium Ion Secondary Battery (Laminated Film Type)

Figure 3:
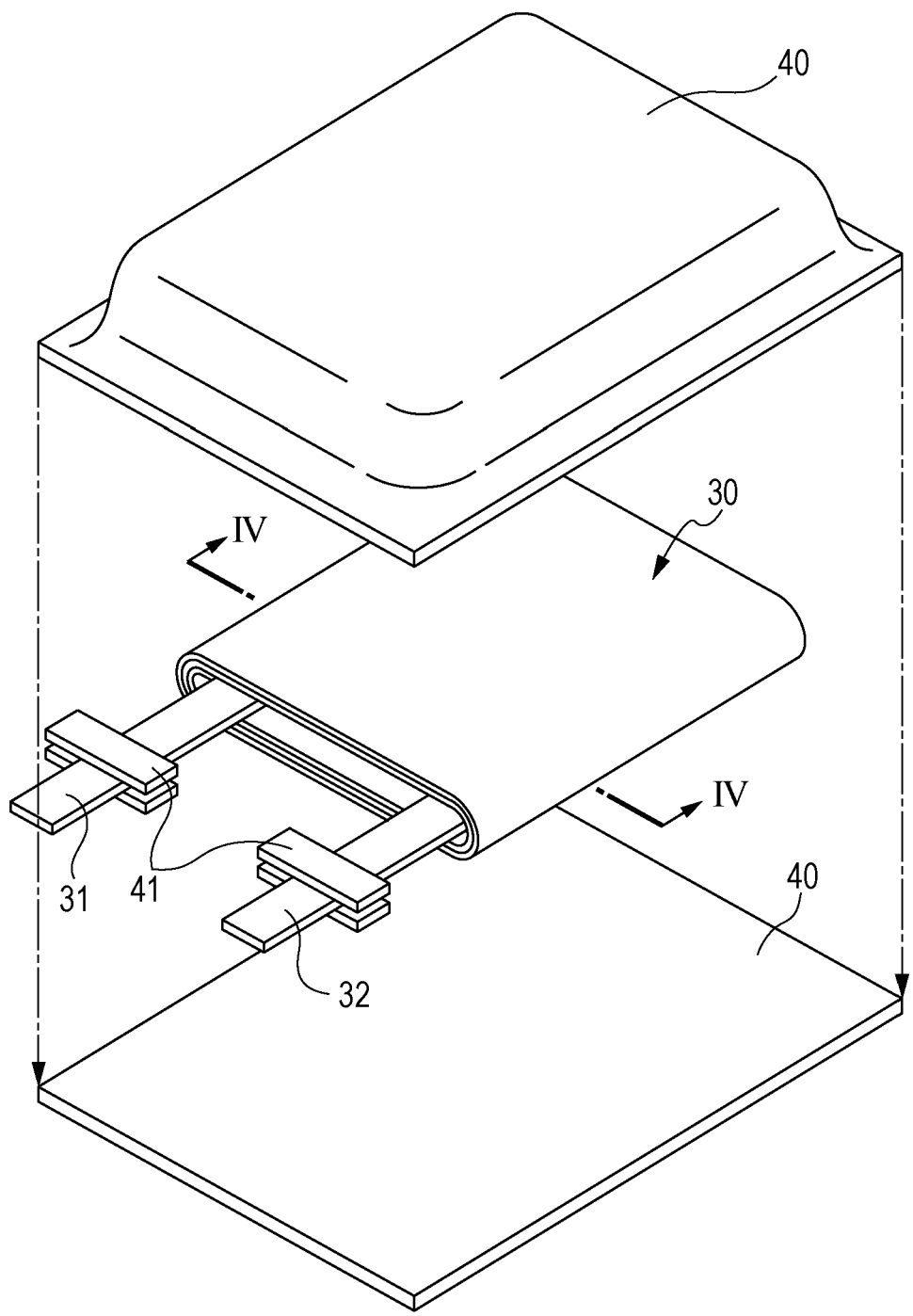
FIG. 3 is a perspective view illustrating a configuration of another lithium ion secondary battery (laminated film type) using the positive electrode active material according to the embodiment of the present disclosure.
Figure 4:
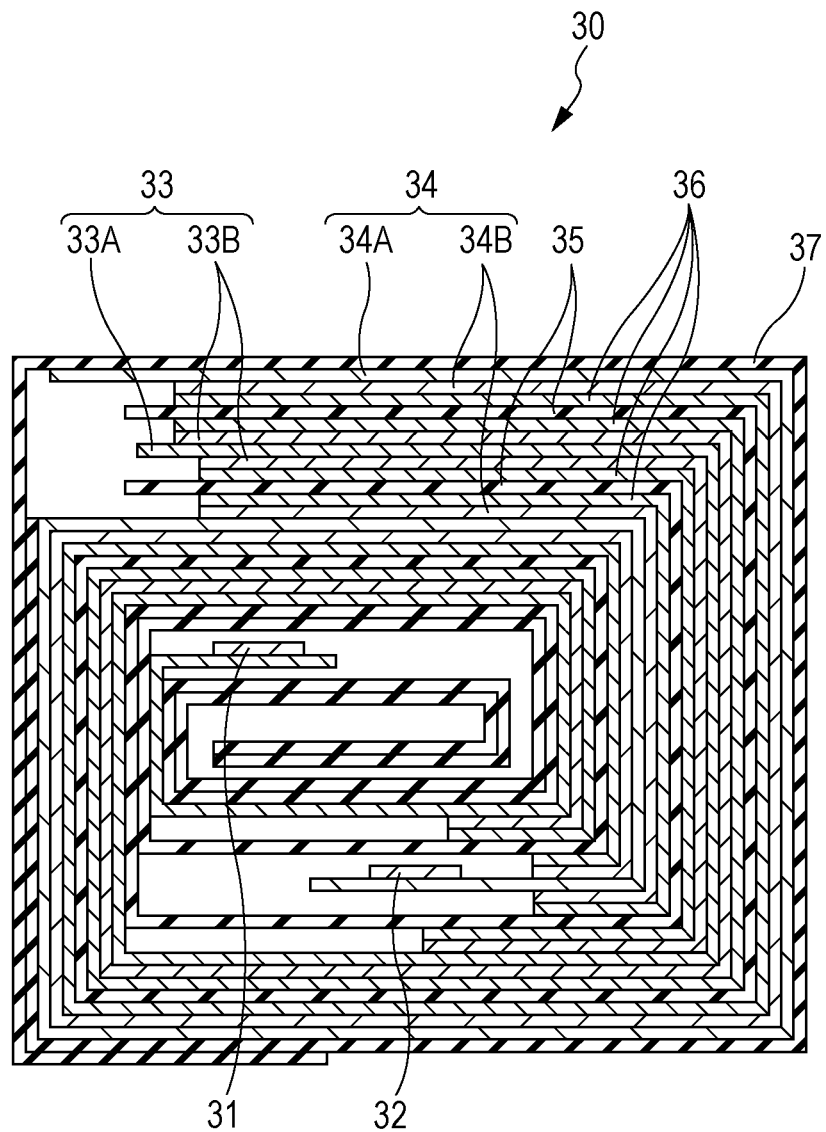
FIG. 4 is a cross-sectional view illustrating the wound electrode body, which is taken along a line IV-IV in FIG. 3.

FIG. 3 shows an exploded perspective view of a laminated film type lithium ion secondary battery, and FIG. 4 shows an exploded view taken along a line IV-IV of a wound electrode body 30 shown in FIG. 3. Hereinafter, components of the cylinder type lithium ion secondary battery described above will be referred to as necessary.

Entire Configuration of Secondary Battery

This secondary battery has a main configuration in which the wound electrode body 30 is accommodated in a film-shaped exterior member 40. This wound electrode body 30 is configured in such a manner that a positive electrode 33 and a negative electrode 34 are laminated with a separator 35 and an electrolyte layer 36 interposed therebetween and this laminated body is wound. A positive electrode lead 31 is attached to the positive electrode 33, and a negative electrode lead 32 is attached to the negative electrode 34. The outermost peripheral portion of the wound electrode body 30 is protected by a protective tape 37.

For example, the positive electrode lead 31 and the negative electrode lead 32 lead out from the inside of the exterior member 40 toward the outside in the same direction. The positive electrode lead 31 is formed of, for example, a conductive material such as aluminum, and the negative electrode lead 32 is formed of, for example, a conductive material such as copper, nickel, or stainless steel. This material has, for example, a thin plate shape or a network shape.

The exterior member 40 is a laminated film in which, for example, a fusion layer, a metallic layer, and a surface protecting layer are laminated in this order. In this laminated film, for example, fusion layers of two sheets of films are adhered to each other in an external periphery through a fusion or by an adhesive or the like in such a manner that the fusion layer is opposite to the wound electrode body 30. The fusion layer is formed of, for example, a film of polyethylene, polypropylene, or the like. The metallic layer is formed of, for example, aluminum foil. The surface protecting layer is formed of, for example, a film of nylon, polyethylene terephthalate, or the like.

Among these, as the exterior member 40, an aluminum laminated film in which the polyethylene film, aluminum foil, and the nylon film are laminated in this order is preferable. However, the exterior member 40 may be formed by a laminated film having another lamination structure, a polymer film such as polypropylene, or a metallic film.

An adhesive film 41 is inserted between the exterior members 40 and the positive electrode lead 31 and the negative electrode lead 32 to prevent the penetration of outside air. This adhesive film 41 is formed of a material having an adhesion property with respect to the positive electrode lead 31 and the negative electrode lead 32. As this material, a polyolefin resin such as polyethylene, polypropylene, modified polyethylene, modified polypropylene, or the like may be exemplified.

The positive electrode 33 includes a positive electrode current collector 33A and a positive electrode active material layer 33B provided on both surfaces of the positive electrode current collector 33A. The negative electrode 34 includes a negative electrode current collector 34A and a negative electrode active material layer 34B provided on both surfaces of the negative electrode current collector 34A. The configurations of the positive electrode current collector 33A, the positive electrode active material layer 33B, the negative electrode current collector 34A, and the negative electrode active material layer 34B are the same as those of the positive electrode current collector 21A, the positive electrode active material layer 21B, the negative electrode current collector 22A, and the negative electrode active material layer 22B. In addition, a configuration of the separator 35 is the same as that of the separator 23.

In the electrolyte layer 36, an electrolytic solution formed of a polymer compound is maintained, and the electrolyte layer 36 may include another material such as an addictive if necessary. This electrolyte layer 36 is a so-called gel type electrolyte. This gel type electrolyte is preferable. This is because high ion conductivity (for example, 1 mS/cm or more at room temperature) may be obtained and a leakage of the electrolytic solution is prevented.

The polymer compound includes any one kind or two kinds or more of the following polymer materials or the like: polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylate, polymethacrylate, styrene-butadiene rubber, nitrile butadiene rubber, polystyrene, polycarbonate, and a copolymer of vinylidene fluoride and hexafluoropyrene. Among these, polyvinylidene fluoride or the copolymer of vinylidene fluoride and hexafluoropyrene are preferable. This is because these are electrochemically stable.

The composition of the electrolytic solution is the same as that of the electrolytic solution described with respect to the cylinder type. However, in regard to the electrolyte layer 36 that is a gel-type electrolyte, the nonaqueous solvent of the electrolytic solution includes not only a liquid solvent but also a material having an ion conductivity that can dissociate the electrolyte salt. Therefore, in the case of using the polymer compound having the ion conductivity, the polymer compound is also included in the solvent.

In addition, instead of the gel-type electrolyte layer 36, the electrolytic solution may be used as is. In this case, the electrolytic solution is impregnated in the separator 35.

Operation of Lithium Ion Secondary Battery

In this secondary battery, for example, during charge, lithium ions emitted from the positive electrode 33 are occluded in the negative electrode 34 through the electrolyte layer 36. In addition, for example, during discharge, lithium ions emitted from the negative electrode 34 are occluded in the positive electrode 33 through the electrolyte layer 36.

Method of Manufacturing Lithium Ion Secondary Battery

The secondary battery including the gel-type electrolyte layer 36 is manufactured, for example, in the following three kinds of sequences.

In a first sequence, first, the positive electrode 33 and the negative electrode 34 are manufactured by the same sequence of the positive electrode 21 and the negative electrode 22. In this case, the positive electrode active material layer 33B is formed at both surfaces of the positive electrode current collector 33A and thereby the positive electrode 33 is manufactured, and the negative electrode active material layer 34B is formed at both surfaces of the negative electrode current collector 34A, and thereby the negative electrode 34 is manufactured. Subsequently, a precursor solution including an electrolytic solution, a polymer compound, and a solvent such as an organic solvent is prepared. This precursor solution is applied on the positive electrode 33 and the negative electrode 34, and thereby the gel-type electrolyte layer 36 is formed. Subsequently, the positive electrode lead 31 is attached to the positive electrode current collector 33A through a welding or the like, and the negative electrode lead 32 is attached to the negative electrode current collector 34A through a welding or the like. Subsequently, the positive electrode 33 and the negative electrode 34 to which the electrolyte layer 36 is provided, respectively, are laminated with the separator 35 interposed therebetween, and are wound to form the wound electrode body 30. Then, a protective tape 37 is adhered to the outermost peripheral portion of the wound electrode body 30. Finally, the wound electrode body 30 is interposed between two sheets of film-shaped exterior members 40 and the peripheries of the exterior members 40 are bonded to each other through thermal fusion or the like to seal the wound electrode body 30 in the exterior members 40. In this case, an adhesive film 41 is interposed between the positive electrode and negative electrode leads 31 and 32 and the exterior members 40.

In a second sequence, first, the positive electrode lead 31 is attached to the positive electrode 33, and the negative electrode lead 32 is attached to the negative electrode 34. Subsequently, the positive electrode 33 and the negative electrode 34 are laminated with the separator 35 interposed therebetween and this laminated body is wound to manufacture a wound body that is a precursor of the wound electrode body 30. Then, the protective tape 37 is adhered to the outermost peripheral portion of the wound body. Subsequently, the wound body is interposed between two sheets of film-shaped exterior members 40 and the peripheries of the exterior members 40 are bonded to each other through thermal fusion or the like with one side left to accommodate the wound electrode body 30 in the exterior members 40 having a bag shape. Subsequently, an electrolyte composition including an electrolytic solution, monomers that are a raw material of a polymer compound, a polymerization initiating agent, and other material such as a polymerization prohibiting agent according to necessity is prepared, and this electrolyte composition is injected into the bag-shaped exterior members 40. An opening portion of the exterior members 40 is sealed through thermal fusion. Finally, the monomers are thermally polymerized to form a polymer compound, and thereby the gel-type electrolyte layer 36 is formed.

In a third sequence, first, a wound body is manufactured in the same sequence as that in the second sequence except that the separator 35 to which a polymer compound is applied on both surfaces thereof is used. Then, the wound body is accommodated in the bag-shaped exterior members 40. As the polymer compound applied to the separator 35, a polymer (homopolymer, copolymer, multi-component copolymer, or the like) including vinylidene fluoride as a component may be exemplified. Specifically, polyvinylidene fluoride, a binary copolymer including vinylidene fluoride and hexafluoropropylene as a component, a ternary copolymer including vinylidene fluoride, hexafluoropropylene, and chlorotrifluoroethylene as a component, or the like may be exemplified. In addition, another one kind or two kinds or more of polymer compounds may be used together with a polymer including vinylidene fluoride as a component. Consequently, an electrolytic solution is prepared and is injected into the inside of the exterior members 40. Then, the opening portion of the exterior members 40 is sealed through thermal fusion or the like. Finally, the exterior members 40 are heated while a load is applied thereto, and the separator 35 is brought into close contact with the positive electrode 33 and the negative electrode 34 with a polymer compound interposed therebetween. In this manner, the electrolytic solution is impregnated in the polymer compound, and gelation occurs in the polymer compound and thereby the electrolyte layer 36 is formed.

In this third sequence, swelling of the battery is suppressed compared to the first sequence. In addition, in this third sequence, almost none of the monomer, the solvent, or the like that are raw materials of the polymer compound remain in the electrolyte layer 36, such that a forming process of the polymer compound may be effectively controlled. Therefore, it is possible to obtain a sufficient adhesion property between the positive electrode 33, the negative electrode 34, and the separator 35, and the electrolyte layer 36.

Operation and Effect of Lithium Ion Secondary Battery

According to the laminated film type lithium ion secondary battery, the positive electrode active material layer 33B of the positive electrode 33 includes the above-described positive electrode active material (first and second lithium composite oxides), such that it is possible to obtain an excellent capacity characteristic and an excellent gas emission characteristic. Other operations and effects are the same as those in the cylinder type.

3. Use of Lithium Ion Secondary Battery

Next, an application example of the above-described lithium ion secondary battery will be described.

The use of the secondary battery is not particularly limited as long as this secondary battery can be used as a power source for driving or a power storage source for storing power in a machine, an apparatus, instrument, a device, or a system (assembly of a plurality of apparatuses or the like). In a case where the secondary battery is used as a power source, the power source may be a main power source (a power source that is preferentially used), or an auxiliary power source (a power source that is used instead of the main power source, or a power source that is used by being switched from the main power source). The kind of the main power source is not limited to the secondary battery.

As the use of the secondary battery, for example, the following uses or the like may be exemplified: a portable electronic apparatus such as a video camera, a digital still camera, a mobile telephone, a notebook PC, a wireless telephone, a headphone stereo, a portable radio, a portable television, and a portable PDA (personal digital assistant), a household electronic apparatus such as an electric shaver, a storage device such as a backup power source and a memory card, an electric tool such as an electric drill and an electric slicer, a medical electronic apparatus such as a pacemaker or a hearing aid, an electric vehicle (including a hybrid vehicle), and a power storage system such as a household battery system that stores power for an emergency.

Among these, the secondary battery is effective for the application to the electric tool, the electric vehicle, the power storage system, or the like. This is because excellent characteristics are necessary for the secondary battery, and it is possible to effectively realize an improvement in characteristics by using the secondary battery according to an embodiment of the present disclosure. In addition, in regard to the electric tool, a moving part (for example, a drill or the like) is driven by using the secondary battery as a driving power source. The electric vehicle operates (runs) by using the secondary battery as a driving power source, and may be a vehicle (a hybrid vehicle or the like) that is also provided with another driving source in addition to the secondary battery. The power storage system is a system using the secondary battery as a power storage source. For example, in a household power storage system, power is stored in the secondary battery that is a power storage source and the power stored in the secondary battery is consumed according to necessity.

EXAMPLES

Hereinafter, specific examples of the present disclosure will be described.

Experiment Examples 1-1 to 1-17

Synthesis of Positive Electrode Active Material

First and second lithium composite oxides that are positive electrode active materials were obtained by the following sequence.

First, the first lithium composite oxide shown in Table 1 was synthesized. In this case, lithium carbonate ($Li_2CO_3$) powder and cobalt carbonate ($CoCO_3$) powder that are raw materials were mixed in a mole ratio of Li:Co=1:1, and the resultant mixture was heated at 900° C. for five hours in the atmosphere to obtain $LiCoO_2$.

Furthermore, $LiNi_{0.8}Co_{0.18}Al_{0.02}O_2$ was synthesized by the same sequence as the above-described sequence except that a nickel oxide (NiO) powder and an aluminum oxide ($Al_2O_3$) powder as a raw material were further mixed in a mole ratio shown in Table 1.

Next, the second lithium composite oxide shown in Table 1 was synthesized. In this case, each powder of lithium oxide ($Li_2O$), nickel oxide (NiO), and aluminum oxide ($Al_2O_3$), which are raw materials, was mixed in a mole ratio of Li:Ni:Al=2:0.95:0.05, and then the resultant mixture was crushed using a ball mill. Subsequently, the mixed powder after being crushed was compression-molded to form a pellet, and then this pellet was baked at a high baking temperature shown in table 2 for 20 hours under a nitrogen atmosphere. This baked pellet was pulverized.

With respect to a powder after being pulverized, a crystal structure was analyzed using an XRD method. From this analysis, a crystal peak that belongs to $Li_2NiO_2$ that is a base material of the second lithium composite oxide was detected. In addition, a composition of the powder was analyzed using ICP emission spectral analysis, and as a result thereof, it was confirmed that an atomic ratio was Ni:Al=0.95:0.05.

In addition to this, through the same sequence as that described above except that the mole ratio was changed, $Li_2Ni_{0.99}Al_{0.01}O_2$ or $Li_2Ni_{0.85}Al_{0.15}O_2$ was synthesized. In addition, as raw materials, at least one kind or two kinds or more of silicon oxide ($SiO_2$), copper oxide (CuO), iron oxide ($Fe_2O_3$), zinc oxide (ZnO), manganese carbonate ($MnCO_3$), titanium oxide ($TiO_2$), and cobalt oxide (CoO) were mixed in a mole ratio shown in Table 1, and $Li_2Ni_{0.95}Si_{0.05}O_2$ or the like were synthesized in the same sequence as that described above except that a baking temperature was changed according to necessity. In this case, a crystal peak that belongs to Li$_2$NiO$_2$ was also detected. In addition, an atomic ratio was confirmed using ICP emission spectral analysis.

Characteristics of these positive electrode active materials (first and second lithium composite oxides) and a lithium ion secondary battery using these positive electrode active materials were investigated and results shown in Tables 1 and 2 were obtained.

Calculation of Charge Capacity vs Lithium Metal Per Unit Volume

Figure 5:
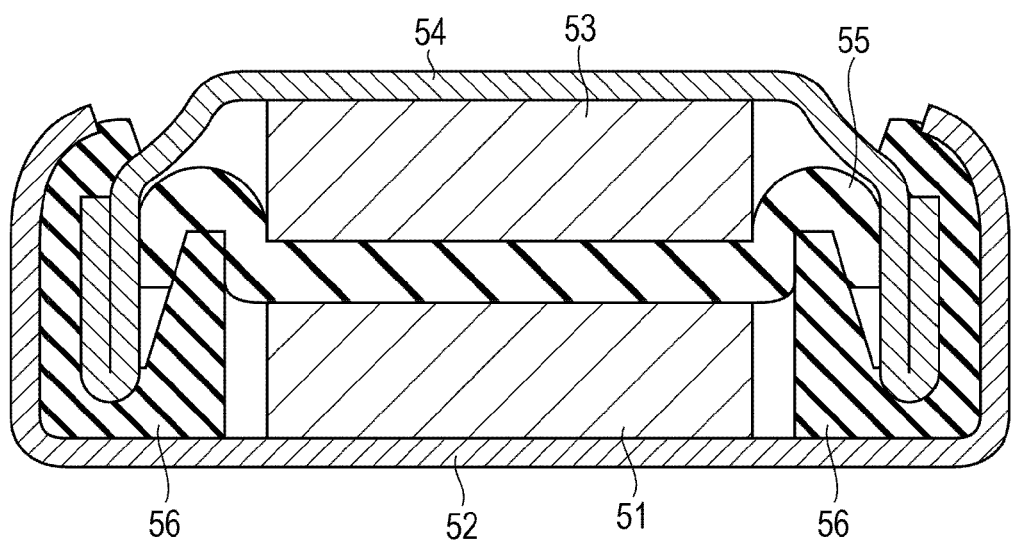
FIG. 5 is a cross-sectional view illustrating a configuration of a test secondary battery (coin type).

To obtain a charge capacity per unit volume, a coin type lithium ion secondary battery shown in FIG. 5 was manufactured. This secondary battery was obtained in such a manner that a test electrode 51 using a positive electrode active material was accommodated in an exterior casing 52, a counter electrode 53 was attached to an exterior cup 54, and then the exterior casing 52 and the exterior cup 54 were laminated with a separator 55 in which an electrolytic solution was impregnated interposed therebetween, and were closed with a gasket 56 interposed therebetween.

In the case of manufacturing the test electrode 51, 96 parts by mass of a positive electrode active material (first lithium composite oxide), 3 parts by mass of polyvinylidene fluoride (PVDF) that is a positive electrode binding agent, and 1 part by mass of carbon black that is a positive electrode conducting agent were mixed, and the resultant mixture was kneaded with N-methyl-2-pyrrolidone (NMP) (a separate amount of) to obtain a positive electrode mixture slurry. Consequently, the positive electrode mixture slurry was applied on both surfaces of a positive electrode current collector (aluminum foil: thickness=15 μm) and was dried to form a positive electrode active material layer. This positive electrode active material layer was compression-molded using a pressing machine, and then the resultant compression-molded object was punched to obtain a pellet (diameter=15 mm). As the counter electrode 53, a lithium metal plate (diameter=16 mm) was used. In the case of preparing the electrolytic solution, ethylene carbonate (EC) and dimethyl carbonate (DMC) that served as a solvent were mixed, and lithium hexafluorophosphate (LiPF$_6$) that was an electrolyte salt was dissolved therein. In this case, the composition (mass ratio) of the solvent was set to EC:DMC=50:50, and the content of the electrolyte salt with respect to the solvent was set to 1 mol/dm$^3$ (=1 mol/l).

A constant voltage and constant current charge was performed until a battery voltage reached 4.35 V with a current corresponding to a current density of 0.2 mA/cm$^2$ by using the secondary battery, and when the current decreased to 5% of a designed capacity, the charge was terminated, and then a charge capacity mAh was measured. Consequently, based on weight g of the first lithium composite oxide, a charge capacity mAh/g per unit weight, that is, a charge capacity mAh/weight g was calculated. Finally, based on a true density g/cm$^3$ of the first lithium composite oxide that was obtained through a gas replacement method, a charge capacity mAh/cm$^3$ per unit volume, that is, a charge capacity mAh/g per unit volume×a true density g/cm$^3$ was calculated.

In addition, with respect to the second lithium composite oxide, a charge capacity per unit volume was calculated in the same sequence.

Calculation of Discharge Capacity

To obtain a discharge capacity, another coin-type lithium ion secondary battery (electrode area=1.77 cm$^2$) was manufactured using the above-described positive electrode active material.

In a case where a test electrode 51 was manufactured, first, 96 parts by mass of a positive electrode active material (first and second lithium composite oxides; median size=10 μm), 3 parts by mass of PVDF that is a positive electrode binding agent, and 1 part by mass of carbon black that is a positive electrode conducting agent were mixed, and the resultant mixture was kneaded with NMP (a separate amount of) to obtain a positive electrode mixture slurry. A mixing ratio of the first and second lithium composite oxides was set as shown in Table 1. Consequently, the positive electrode mixture slurry was applied on both surfaces of a positive electrode current collector (aluminum foil: thickness=15 μm) using a bar coater (gap=150 μm) and was dried at a temperature of 100° C. to form a positive electrode active material layer. Finally, this positive electrode active material layer was compression-molded using a roll pressing machine.

In the case of manufacturing a counter electrode 53, first, silicon Si, silicon oxide (SiO), or tin Sn (median size of all of these is 7 μm), which are negative electrode active materials, and 20 wt % NMP solution of polyimide were mixed in a weight ratio of 7:2 to obtain a negative electrode mixture slurry. Consequently, the negative electrode mixture slurry was applied on both surfaces of a negative electrode current collector (copper foil: thickness=15 μm) using a bar coater (gap=150 μm) and was dried at a temperature of 80° C. to form a negative electrode active material layer. Finally, this negative electrode active material layer was compression-molded using a pressing machine, and then was baked at a high temperature of 700° C. for three hours. In this case, a press pressure was adjusted and a ratio (volume %) of pores in the negative electrode active material was set to 30%. This ratio of pores was calculated based on the true density of each material included in the negative electrode active material layer after measuring a thickness and weight of the negative electrode active material layer after being baked.

Consequently, a test electrode 51 was accommodated in the exterior casing 52, and a counter electrode 53 was attached to an exterior cup 54, and then the exterior casing 52 and the exterior cup 54 were laminated with a separator 55 in which an electrolytic solution was impregnated interposed therebetween, and were closed with a gasket 56 interposed therebetween. As a separator 55, a porous polypropylene film (thickness=25 μm) was used. In the case of preparing the electrolytic solution, 4-fluoro-1,3-dioxolane-2-one (FEC) and dimethyl carbonate (DMC), which serve as a solvent, were mixed, and lithium hexafluorophosphate (LiPF$_6$) that was an electrolyte salt was dissolved therein. In this case, a composition (mass ratio) of the solvent was set to FEC:DMC=50:50, and the content of the electrolyte salt with respect to the solvent was set to 1 mol/dm$^3$ (=1 mol/l). In addition, 3 wt % of tungstosilicic acid, which is an additive, was added to the electrolytic solution according to necessity.

To measure a discharge capacity, two sets of coin-type secondary batteries were prepared. A constant voltage and constant current charge was performed until a battery voltage reached 4.4 V with a current corresponding to a current density of 0.2 mA/cm$^2$ by using a first set of secondary batteries, and when the current decreased to 5% of a designed capacity, the charge was terminated. At this time, the secondary battery was disassembled, and the test electrode 51 and the counter electrode 53 were taken out. A thickness of a positive electrode active material layer and a negative electrode active material layer was measured using a step difference measuring device, and a total volume cm$^3$ of the positive electrode active material layer and the negative electrode active material layer after the charge was calculated. On the other hand, a charge was performed under the same condition as described above, and a constant current discharge was performed until a battery voltage reached 2.5 V with a current corresponding to a current density of 0.2 mA/cm² by using a second set of secondary batteries, and then a discharge capacity mAh was measured. Finally, a discharge capacity mAh/cm³ per a total volume of the positive electrode active material layer and the negative electrode active material layer, that is, a discharge capacity mAh/a total volume cm³ was calculated.

Gas Generation Amount Calculation

To investigate a gas generation amount, a laminated film-type lithium ion secondary battery was manufactured using the above-described positive electrode active material. In this case, the test electrode 51 manufactured to calculate a charge capacity per unit volume was processed to have a rectangular shape (5 cm×5 cm) and was used as a positive electrode, and the copper foil to which lithium metal is deposited on one surface thereof was processed to have the same size as the test electrode 51 and was used as a negative electrode. Consequently, the positive electrode and the negative electrode were laminated with the separator, in which the electrolytic solution prepared to calculate a charge capacity per unit volume was impregnated, interposed therebetween. And then, this laminated body was accommodated and sealed in a film-shaped exterior member (6 cm×6 cm) having a bag form (an aluminum laminated film).

In the case of calculating the gas generation amount, first, a constant voltage and constant current charge were charged until a battery voltage reached 4.35 V with a current corresponding to a current density of 0.2 mA/cm² by using the secondary battery. Consequently, appearance of the secondary battery was visually observed, and in a case where it was recognized that a battery swelling caused by the generation of gas was generated, gas inside the film-shaped exterior member was taken out using gas and liquid replacement method, and an amount cm³ of gas was measured. Finally, based on weight g of the second lithium composite oxide, the gas generation amount cm³/g per unit weight, that is, an amount of gas cm³/weight g was calculated.

TABLE 2

| Table 2 | Porosity (volume %) | Additive | Discharge capacity (mAh/cm³) | Gas generation amount (cm³/g) |
|---|---|---|---|---|
| Experiment Example 1-1 | 30 | — | 311 | 1.1 |
| Experiment Example 1-2 | 30 | — | 311 | 1.2 |
| Experiment Example 1-3 | 30 | — | 312 | 1.1 |
| Experiment Example 1-4 | 30 | — | 305 | 0.5 |
| Experiment Example 1-5 | 30 | — | 309 | 1.5 |
| Experiment Example 1-6 | 30 | — | 314 | 1.1 |
| Experiment Example 1-7 | 30 | — | 311 | 1.1 |
| Experiment Example 1-8 | 30 | — | 313 | 1.0 |
| Experiment Example 1-9 | 30 | — | 313 | 1.1 |
| Experiment Example 1-10 | 30 | — | 312 | 7.2 |
| Experiment Example 1-11 | 30 | — | 312 | 1.1 |
| Experiment Example 1-12 | 30 | — | 309 | 1.3 |
| Experiment Example 1-13 | 30 | — | 376 | 1.1 |
| Experiment Example 1-14 | 30 | — | 339 | 1.1 |
| Experiment Example 1-15 | 30 | — | 412 | 1.1 |
| Experiment Example 1-16 | 30 | Tungstosilicic acid (3 wt %) | 311 | 0.9 |
| Experiment Example 1-17 | 30 | — | 360 | 1.1 |

Experiments 2-1 to 2-11

Synthesis of Positive Electrode Active Material

For comparison, characteristics of the first and second lithium composite oxides, and the lithium ion secondary bat-

TABLE 1

| | Positive electrode active material | | | | | | |
|---|---|---|---|---|---|---|---|
| | First lithium composite oxide L1 | | Second lithium composite oxide L2 | | | | Negative |
| | Kind | Charge capacity (mAh/cm³) | Kind | Charge capacity (mAh/cm) | Baking temperature (°C.) | Weight ratio L1:L2 | electrode active material |
| Experiment Example 1-1 | $LiCoO_2$ | 836 | $Li_2Ni_{0.95}Al_{0.05}O_2$ | 1354 | 750 | 90:10 | SiO |
| Experiment Example 1-2 | $LiCoO_2$ | 836 | $Li_2Ni_{0.95}Al_{0.05}O_2$ | 1201 | 600 | 85:15 | SiO |
| Experiment Example 1-3 | $LiCoO_2$ | 836 | $Li_2Ni_{0.99}Al_{0.01}O_2$ | 1410 | 830 | 90:10 | SiO |
| Experiment Example 1-4 | $LiCoO_2$ | 836 | $Li_2Ni_{0.85}Al_{0.15}O_2$ | 1250 | 750 | 85:15 | SiO |
| Experiment Example 1-5 | $LiCoO_2$ | 836 | $Li_2Ni_{0.95}Si_{0.05}O_2$ | 1311 | 750 | 90:10 | SiO |
| Experiment Example 1-6 | $LiCoO_2$ | 836 | $Li_2Ni_{0.4}Cu_{0.55}Al_{0.05}O_2$ | 1476 | 750 | 90:10 | SiO |
| Experiment Example 1-7 | $LiCoO_2$ | 836 | $Li_2Ni_{0.85}Fe_{0.05}Zn_{0.05}Al_{0.05}O_2$ | 1370 | 750 | 90:10 | SiO |
| Experiment Example 1-8 | $LiCoO_2$ | 836 | $Li_2Ni_{0.85}Mn_{0.05}Ti_{0.05}Al_{0.05}O_2$ | 1400 | 750 | 90:10 | SiO |
| Experiment Example 1-9 | $LiCoO_2$ | 836 | $Li_2Ni_{0.8}Co_{0.15}Al_{0.05}O_2$ | 1397 | 750 | 90:10 | SiO |
| Experiment Example 1-10 | $LiCoO_2$ | 836 | $Li_2Ni_{0.6}Cu_{0.35}Al_{0.05}O_2$ | 1300 | 750 | 90:10 | SiO |
| Experiment Example 1-11 | $LiCoO_2$ | 836 | $Li_{2.05}Ni_{0.925}Al_{0.05}O_2$ | 1370 | 750 | 90:10 | SiO |
| Experiment Example 1-12 | $LiCoO_2$ | 836 | $Li_{1.95}Ni_{0.975}Al_{0.05}O_2$ | 1325 | 750 | 90:10 | SiO |
| Experiment Example 1-13 | $LiCoO_2$ | 836 | $Li_2Ni_{0.95}Al_{0.05}O_2$ | 1354 | 750 | 90:10 | Si |
| Experiment Example 1-14 | $LiNi_{0.8}Co_{0.18}Al_{0.02}O_2$ | 994 | $Li_2Ni_{0.95}Al_{0.05}O_2$ | 1354 | 750 | 88:12 | SiO |
| Experiment Example 1-15 | $LiNi_{0.8}Co_{0.18}Al_{0.02}O_2$ | 994 | $Li_2Ni_{0.95}Al_{0.05}O_2$ | 1354 | 750 | 88:12 | Si |
| Experiment Example 1-16 | $LiCoO_2$ | 836 | $Li_2Ni_{0.95}Al_{0.05}O_2$ | 1354 | 750 | 90:10 | SiO |
| Experiment Example 1-17 | $LiCoO_2$ | 836 | $Li_2Ni_{0.95}Al_{0.05}O_2$ | 1354 | 750 | 90:10 | Sn | tery were investigated by the same sequence as that described above except that a composition of the first and second lithium composite oxides, or the like were changed, as shown in Tables 3 and 4.

When a composite oxide ($Li_2NiO_2$) not including M1 (aluminum or the like) as a constituent element was used, a sufficient discharge capacity was obtained, and the gas generation amount increased. On the contrary, when the second

TABLE 3

Table 3

| | Positive electrode active material | | | | | | |
|---|---|---|---|---|---|---|---|
| | First lithium composite oxide L1 | | Second lithium composite oxide L2 | | | | Negative |
| | Kind | Charge capacity (mAh/cm³) | Kind | Charge capacity (mAh/cm³) | Baking temperature (° C.) | Weight ratio L1:L2 | electrode active material |
| Experiment Example 2-1 | $LiCoO_2$ | 836 | — | — | — | 100:0 | SiO |
| Experiment Example 2-2 | $LiCoO_2$ | 836 | — | — | — | 100:0 | Si |
| Experiment Example 2-3 | $LiCoO_2$ | 836 | $Li_2NiO_2$ | 1356 | 750 | 90:10 | SiO |
| Experiment Example 2-4 | $LiCoO_2$ | 836 | $Li_2Ni_{0.95}Al_{0.05}O_2$ | 483.6 | 590 | 90:10 | SiO |
| Experiment Example 2-5 | $LiCoO_2$ | 836 | $Li_2Ni_{0.95}Al_{0.05}O_2$ | 12 | 850 | 90:10 | SiO |
| Experiment Example 2-6 | $LiCoO_2$ | 836 | $Li_2Ni_{0.4}Cu_{0.6}O_2$ | 1451 | 750 | 90:10 | SiO |
| Experiment Example 2-7 | $LiNi_{0.8}Co_{0.18}Al_{0.02}O_2$ | 994 | — | — | — | 100:0 | SiO |
| Experiment Example 2-8 | $LiNi_{0.8}Co_{0.18}Al_{0.02}O_2$ | 994 | — | — | — | 100:0 | Si |
| Experiment Example 2-9 | $LiCoO_2$ | 836 | $Li_2Ni_{0.95}Al_{0.05}O_2$ | 1354 | 750 | 90:10 | SiO |
| Experiment Example 2-10 | — | — | $Li_2Ni_{0.95}Al_{0.05}O_2$ | 1354 | 750 | 0:100 | SiO |
| Experiment Example 2-11 | $LiCoO_2$ | 836 | $Li_2Cu_{0.95}Al_{0.05}O_2$ | 1300 | 850 | 90:10 | SiO |

TABLE 4

| Table 4 | Porosity (volume %) | Additive | Discharge capacity (mAh/cm³) | Gas generation amount (cm³/g) |
|---|---|---|---|---|
| Experiment Example 2-1 | 30 | — | 296 | 0 |
| Experiment Example 2-2 | 30 | — | 360 | 0 |
| Experiment Example 2-3 | 30 | — | 312 | 3.3 |
| Experiment Example 2-4 | 30 | — | 275 | 0.9 |
| Experiment Example 2-5 | 30 | — | 261 | 0 |
| Experiment Example 2-6 | 30 | — | 314 | 12.5 |
| Experiment Example 2-7 | 30 | — | 331 | 0 |
| Experiment Example 2-8 | 30 | — | 402 | 0 |
| Experiment Example 2-9 | 35 | — | 285 | 1.1 |
| Experiment Example 2-10 | 30 | — | 41 | 1.1 |
| Experiment Example 2-11 | 30 | — | 308 | 25.3 |

In a case where the positive electrode active material included the first lithium composite oxide and the second lithium composite oxide having a charge capacity vs lithium metal per unit volume larger than that of the first lithium composite oxide, a large discharge capacity was obtained and the gas generation amount was suppressed to be small compared to a case this condition was not satisfied.

Specifically, when only the first lithium composite oxide was used, gas was not generated, and it was difficult to obtain a sufficient discharge capacity. On the other hand, when only the second lithium composite oxide was used, the gas generation amount was suppressed to be small, and the discharge capacity decreased significantly. On the contrary, when the first and second lithium composite oxides were combined, a sufficient discharge capacity was obtained, as well as the gas generation amount being suppressed to be small.

lithium composite oxide ($Li_2Ni_{0.95}Al_{0.05}O_2$ or the like) including M1 as a constituent element was used, a sufficient discharge capacity was obtained, as well as the gas generation amount being suppressed to be small.

When a composite oxide ($Li_2Ni_{0.4}Cu_{0.55}Al_{0.05}O_2$) including copper and M1 (aluminum or the like) as a constituent element was used, the gas generation amount was apt to increase a little. However, the gas generation amount decreased largely compared to a case where a composite oxide ($Li_2Ni_{0.4}Cu_{0.6}O_2$) including copper as a constituent element but not including M1 as a constituent element was used.

When a composite oxide ($Li_2Cu_{0.95}Al_{0.05}O_2$) including a transition metal element of copper as a main component was used, the gas emission amount increased significantly. On the contrary, when a composite oxide ($Li_2Ni_{0.95}Al_{0.05}O_2$) including a transition metal element of nickel as a main component was used, the discharge capacity increased, as well as the gas emission amount decreasing greatly. As described above, the cause of the different result being obtained depending on a difference in the transition metal element as a main component is as follows. Nickel can be tetravalent nickel and can have a $NiO_2$ form, such that there is an advantageous action in which $NiO_2$ is stabilized by M1 (aluminum or the like). On the contrary, copper may not be tetravalent copper and may not have a $CuO_2$ form, such that the above-described advantageous action by M1 may not be obtained.

The charge capacity per unit volume of the second lithium composite oxide increased or decreased depending on a baking temperature. In this case, when the baking temperature was 600 to 830° C., a second lithium composite oxide having a stable crystal structure and the charge capacity per unit volume was higher than that of the first lithium composite oxide. In addition, when the baking temperature was lower than 600° C., the crystal structure became unstable and therefore the discharge capacity decreased significantly. On the other hand, when the baking temperature was higher than 830° C., a sufficient discharge capacity was not obtained.

When attention was given to a kind of negative electrode active material, in a case where silicon oxide was used rather than silicon, the discharge capacity was apt to decrease. The cause is considered to be because as described above, during an initial charge and discharge, a part of lithium ions is apt to be irreversibly coupled with oxygen in a silicon oxide.

In addition to this, when the electrolytic solution included tungstosilicic acid, the gas emission amount was further decreased while the discharge capacity was maintained. In addition, when a ratio of pores in the negative electrode active material layer was 30% or less, the discharge capacity was further increased.

From the results of Tables 1 to 4, it can be seen that when the positive electrode active material includes the first lithium composite oxide and the second lithium composite oxide having a charge capacity vs lithium metal per unit volume larger than that of the first lithium composite oxide, an excellent battery capacity characteristic and an excellent gas emission characteristic may be obtained.

Hereinbefore, the present disclosure is described with reference to the embodiments and the examples, but the present disclosure is not limited to the embodiments and the examples; various modifications can be made. For example, the positive electrode active material of the embodiments of the present disclosure may be applied to a lithium ion secondary battery in which a capacity of a negative electrode includes a capacity by occlusion and emission of lithium ions and a capacity accompanied with a precipitation and dissolution, and is represented by a sum of the capacities. In this case, a chargeable capacity of a negative electrode material is set to be smaller than that of a discharge capacity of a positive electrode.

In addition, in the embodiments and examples, description is given to a case where a structure of the battery is a cylinder type, a laminated film type, or a coin type, or a case where the battery device has a winding structure, but the present disclosure is not limited thereto. The lithium ion secondary battery according to embodiments of the present disclosure may be equally applied to a case where the lithium ion secondary battery has another battery structure such as a square type and a button type, or a case where the battery device has another structure such as a laminated structure.

In addition, in the embodiments and examples, with respect to a composition (a value of a, or the like) of the second lithium composite oxide expressed by formula (1), an appropriate range derived from results of examples is described. However, this description does not absolutely deny a possibility that the composition may depart from the above-described range. That is, the above-described appropriate range is a particularly desirable range to obtain an effect of the present disclosure to the utmost, such that the composition may be deviated from the above-described range as long as the effect of the present disclosure can be obtained. This is true for a composition (a value of d or the like) of the first lithium composite oxide expressed by formulae (2) to (4).

In addition, for example, the positive electrode active material or the positive electrode is not limited to an application to the lithium ion secondary battery and may be applied to another device such as a capacitor or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lithium ion secondary battery, comprising:
a positive electrode;
a negative electrode; and
an electrolytic solution,
wherein the positive electrode includes a first lithium composite oxide and a second lithium composite oxide as a positive electrode active material, said second lithium composite oxide being expressed by the following formula (1):

$$Li_{1+a}(Ni_bM1_cM2_{1-b-c})_{1.5-0.5a}O_2 \quad (1)$$

wherein, M1 represents at least one selected from among elements of group 13 to group 15 in an extended periodic table of elements excluding boron B, or carbon C, or nitrogen N, M2 represents at least one selected from among elements of group 3 to group 12, and a, b, and c satisfy relationships of $0.95 \le a \le 1.05$, $0 < b \le 0.99$, and $0 < c \le 0.15$, wherein the second lithium composite oxide has a charge capacity greater than the first lithium composite oxide wherein the first lithium composite oxide has a charge capacity per unit volume between 800 to 1000 mAh/cm³ and a charge capacity per unit volume is between 1300 to 1451 mAh/cm³ in a base material ($Li_2NiO_2$) of the second lithium composite oxide, and wherein during an initial charge and a discharge of the lithium ion secondary battery, the second lithium composite oxide is consumed instead of the first lithium composite oxide.

2. The lithium ion secondary battery according to claim 1, wherein in formula (1), M1 represents at least one selected from the group consisting of aluminum Al, silicon Si, indium In, and tin Sn, and M2 represents at least one selected from the group consisting of copper Cu, cobalt Co, manganese Mn, iron Fe, zinc Zn, yttrium, Y, titanium, Ti, and molybdenum Me.

3. The lithium ion secondary battery according to claim 1, wherein the first lithium composite oxide includes at least one among compounds expressed by the following formulae (2) to (4)

$$Li_dNi_{1-e-f}Mn_eM3_fO_{2-g}X_h \quad (2)$$

wherein, M3 represents at least one selected from among elements of group 2 to group 15 in an extended periodic table of elements excluding nickel and manganese, X represents at least one selected from among elements of group 16 and group 17 excluding oxygen O, and d, e, f, g, and h satisfy relationships of $0 \le d \le 1.5$, $0 \le e \le 1$, $0 \le f \le 1$, $-0.1 \le g \le 0.2$, and $0 \le h \le 0.2$ $$Li_jMn_{2-k}M4_kO_mF_n \quad (3)$$

wherein, M4 represents at least one selected from among cobalt, nickel, magnesium Mg, aluminum Al, boron, titanium, vanadium V, chromium Cr, iron, copper, zinc, molybdenum, tin, calcium Ca, strontium Sr, and tungsten W, and j, k, m, and n satisfy relationships of $j \le 0.9$, $0 \le k \le 0.6$, $3.7 \le m \le 4.1$, and $0 \le n \le 0.1$ $$Li_pM5_qPO_4 \quad (4)$$

wherein, M5 represents at least one selected from among elements of group 2 to group 15 in an extended periodic table of elements, and p and q satisfy relationships of $0 \le p \le 2$, and $0.5 \le q \le 2$.

4. The lithium ion secondary battery according to claim 3, wherein in formula (2), M3 represents at least one selected from the group consisting of cobalt, magnesium, aluminum, boron, titanium, vanadium, chromium, iron, copper, zinc, zirconium Zr, molybdenum, tin, calcium, strontium, and tungsten, and in formula (4), M5 represents at least one selected from the group consisting of cobalt, manganese, iron, nickel, magnesium, aluminum, boron, titanium, vanadium, niobium Nb, copper, zinc, molybdenum, calcium, strontium, tungsten, and zirconium.

5. The lithium ion secondary battery according to claim 1, wherein a ratio of the second lithium composite oxide with respect to the first lithium composite oxide and the second lithium composite oxide is set such that a charge capacity vs negative electrode of the second lithium composite oxide becomes Z % or less with respect to a total charge capacity of the positive electrode, when an irreversible capacity that occurs in the negative electrode during an initial charge and discharge is Z % with respect to a total charge capacity vs positive electrode.

6. The lithium ion secondary battery according to claim 1, wherein the negative electrode contains, as a negative electrode active material, a material including at least one of silicon and tin as a constituent element.

7. The lithium ion secondary battery according to claim 6, wherein the negative electrode active material includes silicon oxide $SiO_x$ wherein $0.2 < x < 1.4$.

8. The lithium ion secondary battery of claim 1, wherein in the second lithium composite oxide a ratio of M1 with respect to components $(Ni_bM1_cM2_{1-b-c})$ other than lithium and oxygen is 15% or less in a mole ratio.

9. The lithium ion secondary battery of claim 6, wherein a porosity (volume %) of the negative electrode active material is 30% or less.

10. The lithium ion secondary battery of claim 1, wherein a proportion of the first lithium composite oxide is greater than a proportion of the second lithium composite oxide within the positive electrode.

11. A positive electrode active material, comprising:
a first lithium composite oxide; and
a second lithium composite oxide expressed by the following formula (1):

$$Li_{1+a}(Ni_bM1_cM2_{1-b-c})_{1.5-0.5a}O_2 \quad (1)$$

wherein, M1 represents at least one selected from among elements of group 13 to group 15 in an extended periodic table of elements excluding boron, or carbon, or nitrogen, M2 represents at least one selected from among elements of group 3 to group 12, and a, b, and c satisfy relationships of $0.95 \leq a \leq 1.05$, $0 < b \leq 0.99$, and $0 < c \leq 0.15$, wherein the second lithium composite oxide has a charge capacity greater than the first lithium composite oxide, wherein the first lithium composite oxide has a charge capacity per unit volume between 800 to 1000 mAh/cm³ and a charge capacity per unit volume is between 1300 to 1451 mAh/cm³ in a base material ($Li_2NiO_2$) of the second lithium composite oxide;

wherein the positive electrode active material is used in a lithium ion secondary battery, and wherein during an initial charge and a discharge of the lithium ion secondary battery, the second lithium composite oxide is consumed instead of the first lithium composite oxide.

12. A positive electrode comprising, as a positive electrode active material:
a first lithium composite oxide; and
a second lithium composite oxide expressed by the following formula (1):

$$Li_{1+a}(Ni_bM1_cM2_{1-b-c})_{1.5-0.5a}O_2 \quad (1)$$

wherein, M1 represents at least one selected from among elements of group 13 to group 15 in an extended periodic table of elements excluding boron, or carbon, or nitrogen, M2 represents at least one selected from among elements of group 3 to group 12, and a, b, and c satisfy relationships of $0.95 \leq a \leq 1.05$, $0 < b \leq 0.99$, and $0 < c \leq 0.15$, wherein the second lithium composite oxide has a charge capacity greater than the first lithium composite oxide wherein the first lithium composite oxide has a charge capacity per unit volume between 800 to 1000 mAh/cm³ and a charge capacity per unit volume is between 1300 to 1451 mAh/cm³ in a base material ($Li_2NiO_2$) of the second lithium composite oxide;

wherein the positive electrode is used in a lithium ion secondary battery, and wherein during an initial charge and a discharge of the lithium ion secondary battery, the second lithium composite oxide is consumed instead of the first lithium composite oxide.

13. An electric tool powered by a lithium ion secondary battery including a positive electrode, a negative electrode, and an electrolytic solution, wherein the positive electrode includes a first lithium composite oxide, and a second lithium composite oxide as a positive electrode active material, said second lithium composite oxide being expressed by the following formula (1):

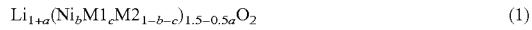
$$Li_{1+a}(Ni_bM1_cM2_{1-b-c})_{1.5-0.5a}O_2 \quad (1)$$

wherein, M1 represents at least one kind selected from among elements of group 13 to group 15 in an extended periodic table of elements excluding boron, or carbon, or nitrogen, M2 represents at least one selected from among elements of group 3 to group 12, and a, b, and c satisfy relationships of $0.95 \leq a \leq 1.05$, $0 < b \leq 0.99$, and $0 < c \leq 0.15$, wherein the second lithium composite oxide has a charge capacity greater than the first lithium composite oxide wherein the first lithium composite oxide has a charge capacity per unit volume between 800 to 1000 mAh/cm³ and a charge capacity per unit volume is between 1300 to 1451 mAh/cm³ in a base material ($Li_2NiO_2$) of the second lithium composite oxide;

wherein during an initial charge and a discharge of the lithium ion secondary battery, the second lithium composite oxide is consumed instead of the first lithium composite oxide.

14. An electric vehicle powered by a lithium ion secondary battery including a positive electrode, a negative electrode, and an electrolytic solution, wherein the positive electrode includes a first lithium composite oxide, and a second lithium composite oxide as a positive electrode active material, said second lithium composite oxide being expressed by the following formula (1):

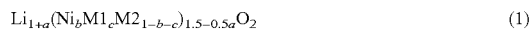
$$Li_{1+a}(Ni_bM1_cM2_{1-b-c})_{1.5-0.5a}O_2 \quad (1)$$

wherein, M1 represents at least one kind selected from among elements of group 13 to group 15 in an extended periodic table of elements excluding boron, or carbon, and nitrogen, M2 represents at least one selected from among elements of group 3 to group 12, and a, b, and c satisfy relationships of $0.95 \leq a \leq 1.05$, $0 < b \leq 0.99$, and $0 < c \leq 0.15$, wherein the second lithium composite oxide has a charge capacity greater than the first lithium composite oxide wherein the first lithium composite oxide has a charge capacity per unit volume between 800 to 1000 mAh/cm$^3$ and a charge capacity per unit volume is between 1300 to 1451 mAh/cm$^3$ in a base material (Li$_2$NiO$_2$) of the second lithium composite oxide wherein during an initial charge and a discharge of the lithium ion secondary battery, the second lithium composite oxide is consumed instead of the first lithium composite oxide.

15. A power storage system, wherein a lithium ion secondary battery including a positive electrode, a negative electrode, and an electrolytic solution is used as a power storage source, the positive electrode includes a first lithium composite oxide, and a second lithium composite oxide as a positive electrode active material, said second lithium composite oxide expressed by the following formula (1):

$$Li_{1+a}(Ni_bM1_cM2_{1-b-c})_{1.5-0.5a}O_2 \qquad (1)$$

wherein, M1 represents at least one kind selected from among elements of group 13 to group 15 in an extended periodic table of elements excluding boron, or carbon, or nitrogen, M2 represents at least one selected from among elements of group 3 to group 12, and a, b, and c satisfy relationships of $0.95 \leq a \leq 1.05$, $0 < b \leq 0.99$, and $0 < c \leq 0.15$, wherein the second lithium composite oxide has a charge capacity greater than the first lithium composite oxide wherein the first lithium composite oxide has a charge capacity per unit volume between 800 to 1000 mAh/cm$^3$ and a charge capacity per unit volume is between 1300 to 1451 mAh/cm$^3$ in a base material (Li$_2$NiO$_2$) of the second lithium composite oxide wherein during an initial charge and a discharge of the lithium ion secondary battery, the second lithium composite oxide is consumed instead of the first lithium composite oxide.

* * * * *